(12) United States Patent
Tomizawa et al.

(10) Patent No.: US 10,635,182 B2
(45) Date of Patent: Apr. 28, 2020

(54) HEAD MOUNTED DISPLAY DEVICE AND CONTROL METHOD FOR HEAD MOUNTED DISPLAY DEVICE

(71) Applicant: SEIKO EPSON CORPORATION, Tokyo (JP)

(72) Inventors: Takashi Tomizawa, Chiisagata-gun (JP); Hiroaki Baba, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/127,534

(22) Filed: Sep. 11, 2018

(65) Prior Publication Data

US 2019/0079590 A1 Mar. 14, 2019

(30) Foreign Application Priority Data

Sep. 12, 2017 (JP) ................................ 2017-174938
May 17, 2018 (JP) ................................ 2018-095200

(51) Int. Cl.

| | |
|---|---|
| *G06F 3/01* | (2006.01) |
| *G02B 27/01* | (2006.01) |
| *G06F 3/0346* | (2013.01) |
| *G06F 3/0354* | (2013.01) |
| *G06F 3/0484* | (2013.01) |
| *G06T 11/60* | (2006.01) |

(52) U.S. Cl.
CPC ......... *G06F 3/017* (2013.01); *G02B 27/0172* (2013.01); *G06F 3/011* (2013.01); *G06F 3/012* (2013.01); *G06F 3/0346* (2013.01); *G06F 3/03547* (2013.01); *G02B 27/017* (2013.01); *G02B 2027/0138* (2013.01); *G02B 2027/0178* (2013.01); *G02B 2027/0187* (2013.01); *G06F 3/0484* (2013.01); *G06T 11/60* (2013.01); *G06T 2200/24* (2013.01)

(58) Field of Classification Search
CPC ... G06F 3/012; G02B 27/0172; G02B 27/017; G02B 2027/0178
See application file for complete search history.

(56) References Cited

U.S. PATENT DOCUMENTS 8,314,887 B2 11/2012 Wakisaka
2012/0280903 A1* 11/2012 Fink ....................... G06F 3/012
345/156

(Continued)

FOREIGN PATENT DOCUMENTS

JP 2012-9924 A 1/2012
JP 2012-079138 A 4/2012

(Continued)

*Primary Examiner* — Koosha Sharifi-Tafreshi
(74) *Attorney, Agent, or Firm* — Oliff PLC

(57) ABSTRACT

An HMD includes an image display unit that is mounted on a head of a user and includes a display region configured to display an image while an outside scene is visible, a first camera, a detecting unit configured to detect a movement of the user's fingers based on a captured image captured by the first camera and to receive an operation based on the detected movement of the fingers, and a display control unit configured to determine whether the detecting unit is ready to detect the operation based on the movement of the fingers, and to display a determination result in the display region.

12 Claims, 12 Drawing Sheets

(56) References Cited

U.S. PATENT DOCUMENTS

| | | | |
|---|---|---|---|
| 2013/0190089 A1* | 7/2013 | Wilson | G06F 3/017 463/36 |
| 2015/0143283 A1* | 5/2015 | Noda | G06F 3/017 715/784 |
| 2016/0034036 A1* | 2/2016 | Ahmed | H04N 21/44008 345/156 |
| 2016/0034039 A1* | 2/2016 | Maeda | G06F 3/011 715/810 |
| 2016/0306431 A1* | 10/2016 | Stafford | G06F 3/014 |
| 2017/0285767 A1* | 10/2017 | Naour | G06F 3/0304 |
| 2018/0046254 A1* | 2/2018 | Takayanagi | G06F 3/017 |

FOREIGN PATENT DOCUMENTS

| | | |
|---|---|---|
| JP | 2013-257694 A | 12/2013 |
| JP | 2017-16370 A | 1/2017 |

* cited by examiner

HEAD MOUNTED DISPLAY DEVICE AND CONTROL METHOD FOR HEAD MOUNTED DISPLAY DEVICE

BACKGROUND

1. Technical Field

The invention relates to a head mounted display device and a control method for the head mounted display device.

2. Related Art

Recent head mounted display devices enable users to perform various operations. Examples of such operations include an operation using a pointing device to input texts, figures, and the like and a touch operation on a screen for selecting an icon or a window. In this context, a display device displaying support information for supporting an operation of a user is known (see, for example, JP-A-2017-16370). A terminal disclosed in JP-A-2017-16370 displays an operation guide image, indicating support information for using an application, overlapping with an image being displayed.

In a case where an operation is performed by using an indication body, the operation thus input is determined with a detecting unit detecting a movement, a shape, a position, and the like of the indication body. Accordingly, the operation, performed by using the indication body, may fail to be input to a display device in some cases, for example, including a case where the detecting unit is not detecting the indication body, a case where the display device is in a busy state, and a case where the operation is performed outside an operation detectable range of the detecting unit. In view of the above, the operation using the indication body requires a user interface with high usability enabling a state of the head mounted display device to be recognized.

SUMMARY

The invention provides a user interface with high usability enabling a state of a head mounted display device to be recognized, for an operation using an indication body.

According to the invention, the head mounted display device includes a display unit that is mounted on a head of a user and includes a display region configured to display an image while an outside scene is visible, an imaging unit, a detecting unit configured to detect a movement of an indication body based on a captured image captured by the imaging unit and to receive an operation based on the detected movement of the indication body, and a display control unit configured to determine whether the detecting unit is ready to detect the operation based on the movement of the indication body, and to display a determination result in the display region.

With this configuration, the determination result indicating whether the detecting unit is ready to detect the operation based on the movement of the indication body is displayed in the display region. Thus, a user interface with high usability enabling whether the head mounted display device is ready to detect the operation to be recognized can be provided for the operation using the indication body.

According to the invention, the display control unit may display, in the display region, a figure, a text, or an icon indicating that the detecting unit is ready to detect the operation, or a range image indicating a range of the indication body detected by the detecting unit, as the determination result.

With this configuration, the figure, the text, the icon, and the range image are displayed as the determination result, and thus a notification indicating whether the operation is detectable can be issued to the outside.

According to the invention, the display control unit may display the range image in the display region when the detecting unit has detected the indication body, and change a display mode of the figure, the text, or the icon displayed in the display region depending on whether the detecting unit is ready to detect the operation.

With this configuration, the range image is displayed when the indication body has been detected, and the display mode of the figure, the text, or the icon is changed depending on whether the detecting unit is ready to detect the operation. Thus, a notification indicating that the detecting unit has detected the indication body can be issued to the outside, and a notification indicating whether the detecting unit is ready to detect the operation can be issued to the outside.

According to the invention, the display control unit may display, as the figure or the icon, a figure or an icon indicating the movement of the indication body to be detected by the detecting unit when the detecting unit is ready to detect the operation.

With this configuration, the figure or the icon indicating the movement of the indication body to be detected by the detecting unit is displayed, and thus the user can recognize the operation using the indication body.

According to the invention, the head mounted display device may further include a processing control unit configured to control a control target in response to the operation received by the detecting unit, and the display control unit may change the figure or the icon indicating a predetermined movement of the indication body to be detected by the detecting unit, according to an operation state of the control target.

With this configuration, the user can be guided to move the indication body corresponding to the operation state of the control target, and the control target can be operated based on the movement of the indication body. Thus, usability of the operation using the indication body can be improved.

According to the invention, the detecting unit may determine whether the detected movement of the indication body corresponds to the predetermined movement of the indication body, and the processing control unit may cause, when the detecting unit has detected a movement of the indication body corresponding to the predetermined movement of the indication body, the control target to execute processing associated with the movement of the indication body detected by the detecting unit.

With this configuration, the predetermined movement of the indication body is performed to cause the control target to execute the processing associated with this movement of the indication body.

According to the invention, the display control unit may display the range image to be overlapped with the indication body, when the detecting unit has detected the indication body.

With this configuration, the range image can be displayed to overlap with the indication body. Thus, the object recognized as the indication body by the head mounted display device can be notified to the outside.

According to the invention, the display control unit may display an operation guide for guiding the operation by the indication body in the display region, if the detecting unit is not ready to receive the operation even after a predetermined first set time elapses from the time when the figure, the text, or the icon is displayed in the display region.

With this configuration, the operation guide can be displayed to guide the operation by the indication body to the user.

According to the invention, the display control unit may display, in the display region, a remaining time until the operation guide is displayed in the display region.

With this configuration, the user who is not familiar with the operation can be notified of the time when the operation guide is displayed.

According to the invention, the display control unit may erase the operation guide being displayed, when a predetermined second set time elapses after the operation guide was displayed in the display region or when the detecting unit has detected the operation based on the movement of the indication body.

With this configuration, the operation guide displayed that is determined to be no longer required to be displayed can be erased so that the visibility of the display region can be improved.

According to the invention, the processing control unit may control a device as the control target according to the operation received by the detecting unit or execute an application program as the control target to execute a function of the application program corresponding to the operation received by the detecting unit.

With this configuration, the device can be controlled by the operation of the indication body, and the application program as the control target can be caused to select a function and execute the function.

According to the invention, a method of controlling a head mounted display device that is mounted on a head of a user and displays an image while an outside scene is visible includes detecting a movement of an indication body based on a captured image captured by an imaging unit, receiving an operation based on the detected movement of the indication body, and determining whether the operation based on the movement of the indication body is configured to be detected, and displaying a determination result in the display region after receiving the operation.

With this configuration, the determination result indicating whether the detecting unit is ready to detect the operation based on the movement of the indication body is displayed in the display region. Thus, a user interface with high usability enabling the state of the head mounted display device to be recognized can be provided for the operation using the indication body.

The display device includes a display unit configured to display an image overlapping with an outside scene or display the image at a periphery of the outside scene, a detecting unit configured to detect an indication body, and a control unit configured to receive an operation based on at least one of a movement, a shape, and a position of the indication body detected by the detecting unit. The control unit determines whether an input operation by the indication body can be performed, and displays a determination result.

With this configuration, it is determined whether the input operation by the indication body can be performed, and the determination result is displayed. Therefore, this configuration enables the user of the display device to recognize the state of the display device to improve easiness of the operation using the indication body.

In the display device, the control unit causes the display unit to display an image, a figure, a text, or an icon indicating that an operation can be received, at a position set in a display region of the display unit.

With this configuration, the image, the figure, the text, or the icon indicating that the operation can be received is displayed. Therefore, this configuration enables the user to instinctively recognize that the display device is ready to receive the operation.

In the display device, the control unit may be configured to be capable of controlling a control target in response to the operation, and change the image, the figure, the text, or the icon indicating that the operation can be received according to the state of the control target controlled in response to the operation.

With this configuration, the image, the figure, the text, or the icon indicating that the operation can be received changes according to the state of the control target. Thus, this configuration enables the user to instinctively recognize the state of the control target.

In the display device, the detecting unit may detect a range including the outside scene that is visible together with the image displayed by the display unit, and the control unit may cause the display unit to display an indication indicating that the operation can be received, when the indication body has been detected within the range by the detecting unit.

With this configuration, the detecting unit detects the indication body within the range including the outside scene that is visible together with the image displayed by the display unit. Thus, the user can move the position of the indication body into the range including the outside scene that is visible, to make the display device ready to receive an operation. When the indication body has been detected within the range, the indication indicating that the operation can be received is displayed so that the state of the display device can be recognized.

In the display device, the detecting unit may include an imaging unit configured to capture an image in the range including the outside scene that is visible together with the image displayed by the display unit, and the control unit may receive the operation by detecting the indication body in a captured image captured by the imaging unit and cause the display unit to display the indication indicating that the operation can be received, when the indication body has been detected in the captured image captured by the imaging unit.

With this configuration, the detecting unit includes the imaging unit configured to capture an image in the range including the outside scene that is visible together with the image displayed by the display unit. Thus, the user can move the position of the indication body within the range including the visible outside scene, to make the display device ready to receive the operation. When the indication body has been detected within the range, the indication indicating that the operation can be received is displayed so that the state of the display device can be recognized.

In the display device, the display unit may include a see-through type display region that allows transmission of external light so that the outside scene is visible, and the detecting unit may detect the indication body in a range including the outside scene that is visible through the display unit.

With this configuration, the detecting unit detects the indication body within the range including the outside scene that is visible through the display unit. Thus, the user can move the position of the indication body into the range including the outside scene that is visible, to make the display device ready to receive the operation.

In the display device, when the detecting unit has detected the indication body, the control unit may cause an image overlapping with the indication body detected by the detecting unit to be displayed.

With this configuration, the image overlapping with the indication body detected by the detecting unit is displayed so that the user can be notified of the position of the detected indication body. Thus, when an object other than the indication body has been detected as the indication body, the user causes the display device to perform indication body detection again, to prevent an incorrect operation from being detected.

In the display device, the control unit may achieve a different display mode of the indication indicating that the operation can be received, for each of the following cases: a case where the indication body is detected by the detecting unit and the operation can be received, a case where the indication body is not detected by the detecting unit, and a case where the operation cannot be received.

With this configuration, the display mode of the indication indicating that the operation can be received is changed depending on whether the indication body has been detected and whether the operation can be received. Thus, the state of the display device can be easily recognized.

In the display device, the control unit may detect a gesture as the input operation based on the movement, the shape, or the position of the indication body detected by the detecting unit, and change the display mode of any one of the image, the figure, the text, and the icon that is displayed by the display unit indicating that the operation can be received, and is associated with the detected input operation.

With this configuration, the display device can be operated by the gesture using the indication body. Further, since the display mode of any of the image, the figure, the text, and the icon associated with the gesture detected by the display device changes, the user can be notified of the detected gesture.

In the display device, the control unit may cause the display unit to display an image for guiding the operation, when an operation by the indication body is not detected within a predetermined first set time after the indication indicating that the operation can be received was displayed.

With this configuration, the operation of the indication body can be guided by the image guiding the operation.

In the display device, the control unit may stop displaying the image guiding the operation when a predetermined second set time has elapsed after the image guiding the operation being displayed or when the operation by the indication body has been detected.

With this configuration, when the displaying of the image guiding the operation is determined to be unnecessary, displaying of the image guiding the operation is terminated, such that a decrease in visibility of the outside scene can be prevented.

In the display device, the control unit controls the device as the control target in response to the operation or executes the application program to execute the processing corresponding to the operation.

With this configuration, the operation of the indication body can be performed to control the device as the control target or to execute the application program to execute the processing corresponding to the operation.

A method of controlling a display device including a display unit configured to display an image overlapping with an outside scene or display the image at a periphery of the outside scene includes detecting an indication body, receiving an operation based on at least one of a movement, a shape, and a position of the detected indication body, determining whether an input operation by the indication body is valid, and displaying a determination result.

With this configuration, it is determined whether the input operation by the indication body is valid, and the determination result is displayed. Therefore, this configuration enables the user of the display device to recognize the state of the display device to improve easiness of the operation using the indication body.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Exemplary Embodiment

An exemplary embodiment of the invention is described below with reference to the accompanying drawings.

Figure 1:
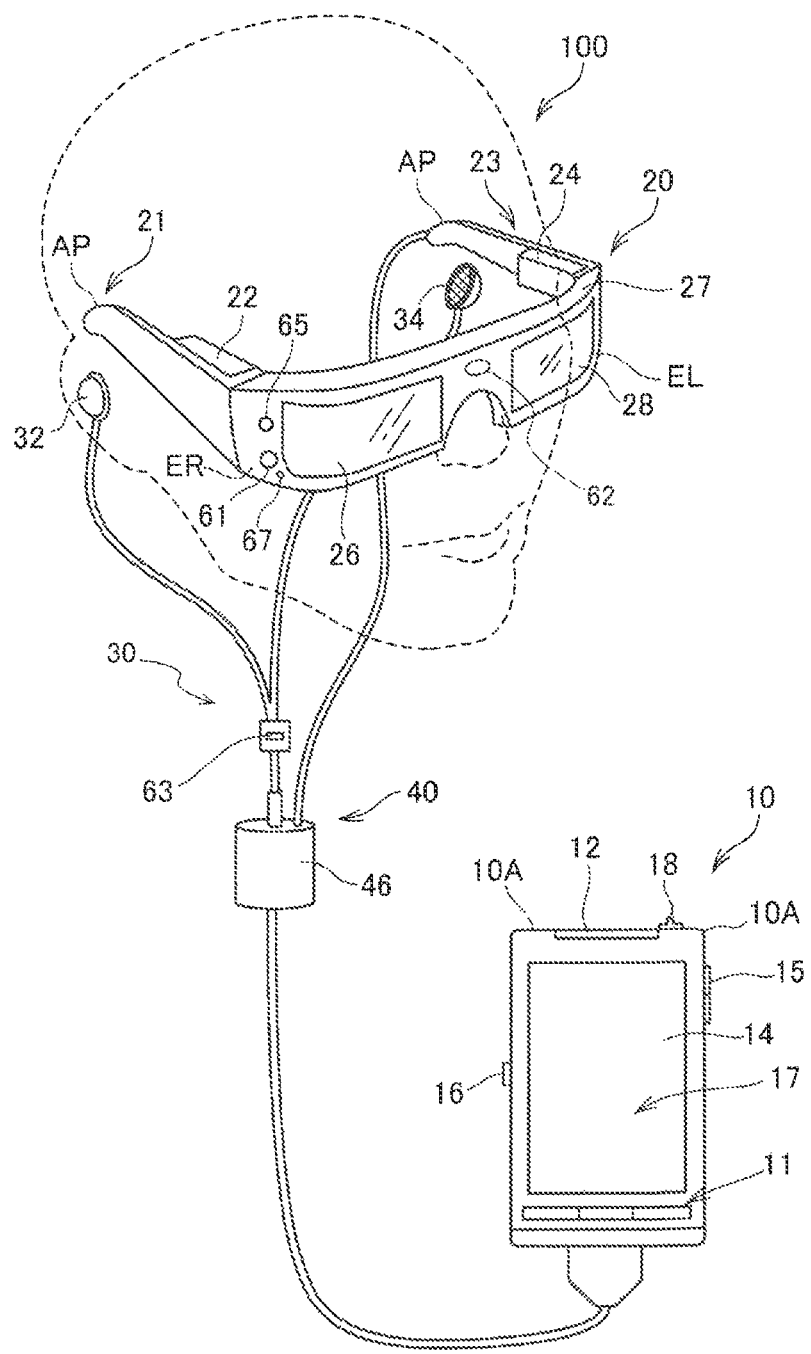
FIG. 1 is an outer view of an HMD.

FIG. 1 is a diagram illustrating an external configuration of a Head Mounted Display (HMD) serving as a head mounted display device employing the invention. The HMD 100 is a display device including a control device 10 and an image display unit 20. The image display unit 20 corresponds to a "display unit" according to the invention.

The control device 10 includes an operation unit that receives an operation of a user, and functions as a controller used by the user to operate the HMD 100. The control device 10 receives the operation of the user, and controls the image display unit 20 in response to the received operation. The image display unit 20 is mounted on the head of the user, and allows the user to visually recognize a virtual image. The user is a person who is wearing the image display unit 20 on his or her head.

Figure 4:
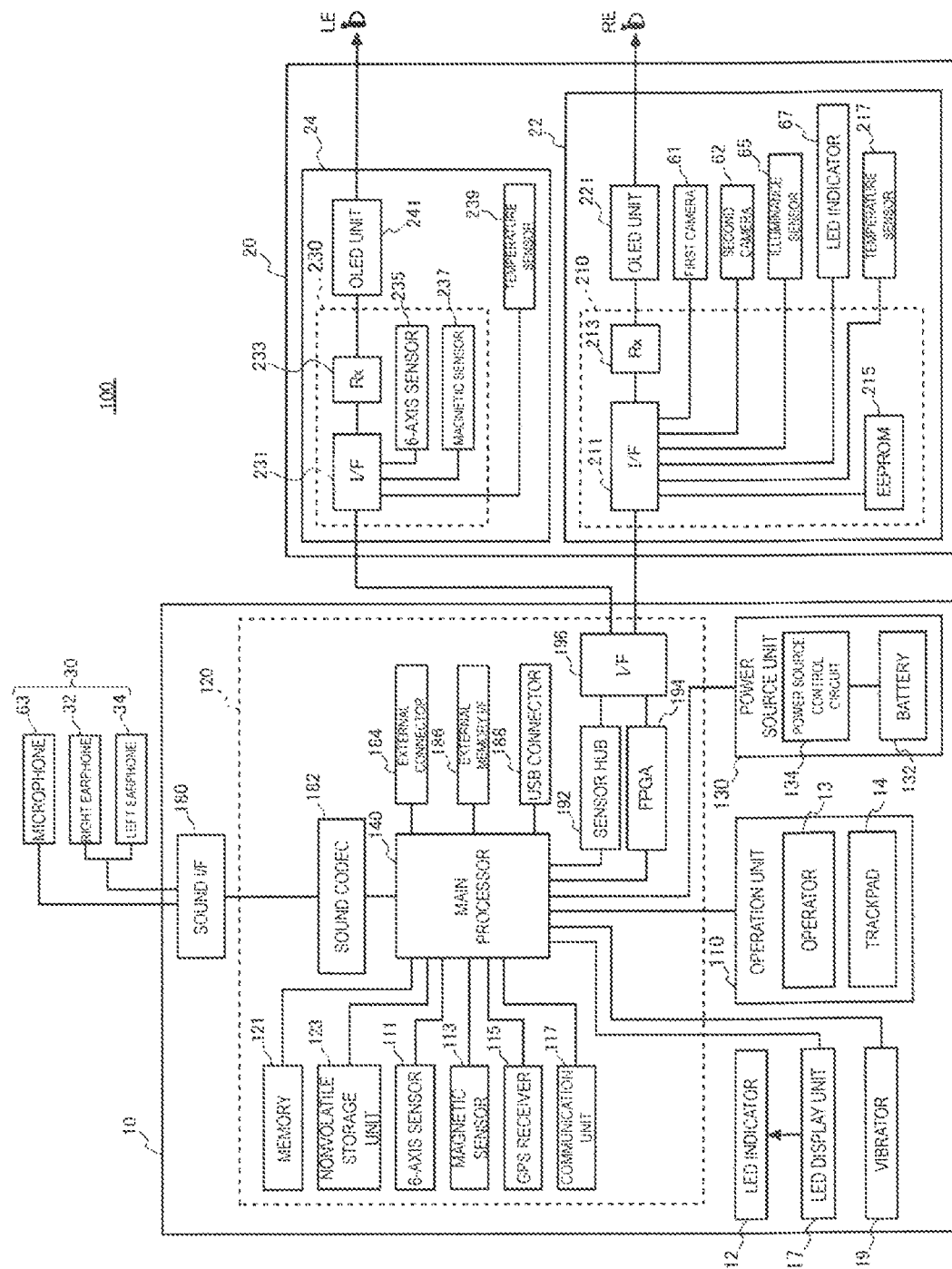
FIG. 4 is a block diagram of the HMD.

The control device 10 has a flat box shaped casing 1A (also referred to as a housing or a main body) as illustrated in FIG. 1. The casing 10A includes various components such as operation buttons 11, a light emitting diode (LED) indicator 12, a trackpad 14, up and down keys 15, a changeover switch 16, and a power switch 18. The operation buttons 11, the up and down keys 15, the changeover switch 16, and the power switch 18 are collectively referred to as an operator 13 (FIG. 4). The user can operate the operator 13 and the trackpad 14 to operate the HMD 100.

The operation buttons 11 include a menu key, a home key, a return key, and the like, more specifically, such keys and switches that can be displaced by a pressing operation. The LED indicator 12 is turned ON or blinks in accordance with the operation status of the HMD 100.

The trackpad 14 includes an operation surface on which a contact operation is detected, and outputs an operation signal in response to the operation with respect to the operation surface. The operation on the operation surface of the trackpad 14 can be detected with various schemes including an electrostatic scheme, a pressure detection scheme, and an optical scheme.

The up and down keys 15 are used for inputting an instruction to raise or lower the volume of sound output from right and left earphones 32 and 34, or inputting an instruction to increase or decrease the brightness of the display on the image display unit 20. The changeover switch 16 is a switch for changing input corresponding to the operation of the up and down keys 15. The power switch 18 is a switch for turning ON and OFF the HMD 100, and includes a slide switch for example.

The image display unit 20 is a mounted member that is mounted on the head of the user, and has an eyewear shape in the first exemplary embodiment. The image display unit 20 has a main body including a right holding unit 21, a left holding unit 23, and a front frame 27. The main body is provided with a right display unit 22, a left display unit 24, a right light-guiding plate 26, and a left light-guiding plate 28.

The right holding unit 21 and the left holding unit 23 respectively extend rearward from both end portions of the front frame 27, and serve as temples of the eyewear to hold the image display unit 20 on the head of the user. Both end portions of the front frame 27 include an end portion positioned on the right side of the user when the image display unit 20 is worn, which is referred to as an end portion ER, and an end portion positioned on the left side of the user, which is referred to as an end portion EL. The right holding unit 21 is arranged to extend from the end portion ER of the front frame 27 to a position corresponding, when the image display unit 20 is worn, to the right side of the head of the user. The left holding unit 23 extends from the end portion EL of the front frame 27 to a position corresponding, when the image display unit 20 is worn, to the left side of the head of the user.

The right light-guiding plate 26 and the left light-guiding plate 28 are provided on the front frame 27. When the image display unit 20 is worn, the right light-guiding plate 26 is positioned in front of the right eye of the user, to guide an image to be visually recognized by the right eye. When the image display unit 20 is worn, the left light-guiding plate 28 is positioned in front of the left eye of the user, to guide an image to be visually recognized by the left eye.

The front frame 27 has a shape connecting one end of the right light-guiding plate 26 and one end of the left light-guiding plate 28 with each other. This connecting position corresponds to the user's glabella when the image display unit 20 is worn by the user. The front frame 27 may be provided with a nose pad portion abutting on the nose of the user when the image display unit 20 is worn, at a connection position of the right light-guiding plate 26 and the left light-guiding plate 28. In this case, the image display unit 20 is held on the head of the user by the nose pad portion and the right and the left holding units 21 and 23. A belt (not illustrated) that is in contact with the back of the head of the user when the image display unit 20 is worn may be connected to the right holding unit 21 and the left holding unit 23. In this case, the image display unit 20 is held on the head of the user by the belt.

The right display unit 22 displays an image with the right light-guiding plate 26. The right display unit 22 is provided on the right holding unit 21 and is disposed around the right side of the head of the user in the worn state. The left display unit 24 displays an image with the left light-guiding plate 28. The left display unit 24 is provided on the left holding unit 23 and is disposed around the left side of the head of the user in the worn state.

The right light-guiding plate 26 and the left light-guiding plate 28 are optical members made of light transmissive resin and the like, and are formed of a prism for example. The right light-guiding plate 26 and the left light-guiding plate 28 guide image light, output from the right display unit 22 and the left display unit 24, to the eyes of the user.

The right light-guiding plate 26 and the left light-guiding plate 28 may be provided with a light control plate (not illustrated) on the surfaces of the right light-guiding plate 26 and the left light-guiding plate 28. The light control plate is a thin-plate shaped optical element having transmittance varying based on a wavelength band of the light, and functions as a so-called wavelength filter. For example, the light control plate is disposed to cover the front side of the front frame 27, opposite to the side of the eyes of the user. Transmittance of light with any wavelength band, such as visible light, infrared light, and ultraviolet light, may be adjusted by appropriately selecting the optical characteristics of the light control plate. Thus, the amount of external light incident on the right light-guiding plate 26 and the left light-guiding plate 28 from outside and transmitting through the right light-guiding plate 26 and the left light-guiding plate 28 may be adjusted.

The image display unit 20 is a see-through type display device that allows transmission of the external light to display an image while the outside scene is visible. The image display unit 20 guides image light, respectively generated by the right display unit 22 and the left display unit 24, to the right light-guiding plate 26 and the left light-guiding plate 28. The image light guided to the right light-gliding plate 26 and the left light-guiding plate 28 is made incident on the right eye and the left eye of the user, so that the user visually recognizes a virtual image. In this manner, the image display unit 20 displays an image. A region where the image display unit 20 can display an image in a visual field range FV of the user wearing the image display unit 20 on his or her head is referred to as a display region VR (FIGS. 6, 8 to 10, and 12).

In a case that the external light from the front side of the user transmit through the right light-guiding plate 26 and the left light-guiding plate 28 to be incident on the eyes of the user, the image light for forming the virtual image and external light are incident on the eyes of the user, and thus the visibility of the virtual image is influenced by the intensity of the external light. Thus, for example, the visibility of the virtual image may be adjusted by disposing the light control plate on the front frame 27 and appropriately selecting or adjusting the optical characteristics of the light control plate. In a typical example, the light control plate may have light transmittance sufficient for enabling the user wearing the HMD 100 to visually recognize the outside scene. The light control plate achieves effects such as protecting the right light-guiding plate 26 and the left light-guiding plate 28 and preventing damage, stain, or the like on the right light-guiding plate 26 and the left light-guiding plate 28. The light control plate may be configured to be detachably attached to the front frame 27 or each of the right light-guiding plate 26 and the left light-guiding plate 28. Thus, a plurality of types of light control plates may be attachable in an exchangeable manner. Furthermore, the image display unit 20 may have a configuration without the light control plate.

The front frame 27 of the image display unit 20 is provided with a first camera 61 and a second camera 62. The first camera 61 and the second camera 62 are configured and arranged to capture an image of an outside scene to be visible for the user wearing the image display unit 20. The outside scene is a scene of the outside in the line of sight direction of the user wearing the image display unit 20 on his or her head. For example, the first camera 61 and the second camera 62 are positioned on the front surface of the front frame 27 to not block the external light transmitting through the right light-guiding plate 26 and the left light-guiding plate 28. In the example illustrated in FIG. 1, the first camera 61 is disposed on an end portion ER side of the front frame 27, and functions as a detecting unit that detects a part of a body of the user or an object attached to the body (hereinafter, referred to as an object to be detected) serving as an indication body. The second camera 62 is disposed at a boundary portion between the right and the left light-guiding plates 26 and 28, that is, at a portion in the middle of the right and left eyes of the user, and captures an image on the front side of the HMD 100 that is in the line of sight direction of the user. The arrangement of the second camera 62 is not limited to the example illustrated in FIG. 1, and the second camera 62 may, for example, be disposed to face an inner side of the image display unit 20 to capture an image of a side of the user's eyes or an image of a rear side of the HMD 100. The second camera 62 may be disposed on an end portion EL side of the front frame 27, so that the first camera 61 and the second camera 62 form a stereo camera.

The first camera 61 corresponds to an "imaging unit" according to the invention. The second camera 62 corresponds to a "control target" according to the invention.

The first camera 61 and the second camera 62 are each a digital camera including an image sensor such as a charged coupled device (CCD) or a complementary metal oxide semiconductor (CMOS), an imaging lens, and the like. Each of the first camera 61 and the second camera 62 which is a monocular camera in the first exemplary embodiment, may also be a stereo camera. The first camera 61 and the second camera 62 each capture an image of at least a part of the outside scene in a front side direction of the HMD 100, that is, a field of vision direction of the user wearing the HMD 100. In other words, the first camera 61 and the second camera 62 each capture an image in a range or a direction overlapping with the field of vision of the user, and captures an image in a gazing direction of the user. The direction and width of the range of the angle of view of the first camera 61 and the second camera 62 can be set as appropriate. In the first exemplary embodiment, the angle of view of each of the first camera 61 and the second camera 62 includes the outside scene visible to the user through the right light-guiding plate 26 and the left light-guiding plate 28. The angle of view of each of the first camera 61 and the second camera 62 may be set to be capable of capturing an image covering the entire field of vision visually recognizable by the user through the right light-guiding plate 26 and the left light-guiding plate 28.

The first camera 61 and the second camera 62 each capture an image according to control performed by an image capturing control unit 153 (FIG. 5) of a control unit 150.

When the power switch 18 is turned ON, a main processor 140 is started by receiving power supply from a power source unit 130, and causes the power source unit 130 to start supplying power to the first camera 61, so that the first camera 61 is turned ON. When a predetermined operation of the indication body has been detected in the captured image data obtained by the first camera 61 or when an operation by the operator 13 has been received, the main processor 140 causes the power supply to the second camera 62 to be started so that the second camera 62 is turned ON.

The HMD 100 may include a distance sensor (not illustrated) that detects a distance to a measurement target positioned along a measurement direction set in advance. For example, the distance sensor may be disposed in the connection portion of the right light-guiding plate 26 and the left light-guiding plate 28 in the front frame 27. In this case, when the image display unit 20 is worn, the distance sensor is positioned substantially in the middle of both eyes of the user in a horizontal direction and is positioned above both eyes of the user in a vertical direction. For example, the measurement direction of the distance sensor may be the front side direction of the front frame 27, that is, a direction overlapping with the image capturing direction of the first camera 61. For example, the distance sensor may have a configuration including: a light source such as a light emitting diode (LED), a laser diode and the like; and a light receiving unit that receives reflected light as a result of reflection of light, emitted from the light source, on the measurement target. The distance sensor may perform a measurement process based on triangulation or time difference, according to control performed by the control unit 150. The distance sensor may have a configuration including: a sound source that emits ultrasonic waves; and a detecting unit that receives the ultrasonic waves reflected by the measurement target. In this case, the distance sensor performs the measurement process based on the time difference with respect to the reflection of the ultrasonic waves, according to control performed by the control unit 150.

Figure 2:
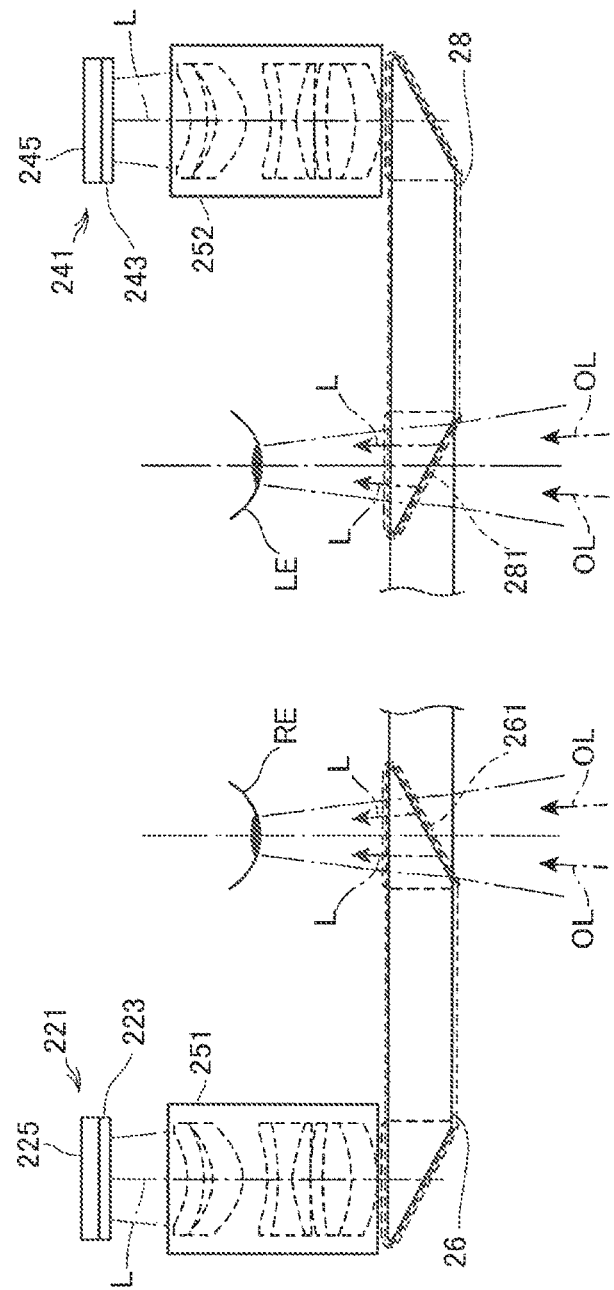
FIG. 2 is a plan view of main part illustrating a configuration of an optical system of the HMD.

FIG. 2 is a plan view of a main part illustrating a configuration of an optical system of the image display unit 20. In FIG. 2, a left eye LE and a right eye RE of the user are illustrated for the sake of description.

As illustrated in FIG. 2, the right display unit 22 and the left display unit 24 are symmetrically configured. The right display unit 22 has a configuration, for making an image visible with the right eye RE of the user, including: an Organic Light Emitting Diode (OLED) unit 221 that emits image light; and a right optical system 251 including a lens group that guides image light L emitted from the OLED unit 221. The right optical system 251 guides the image light L to the right light-guiding plate 26.

Figure 5:
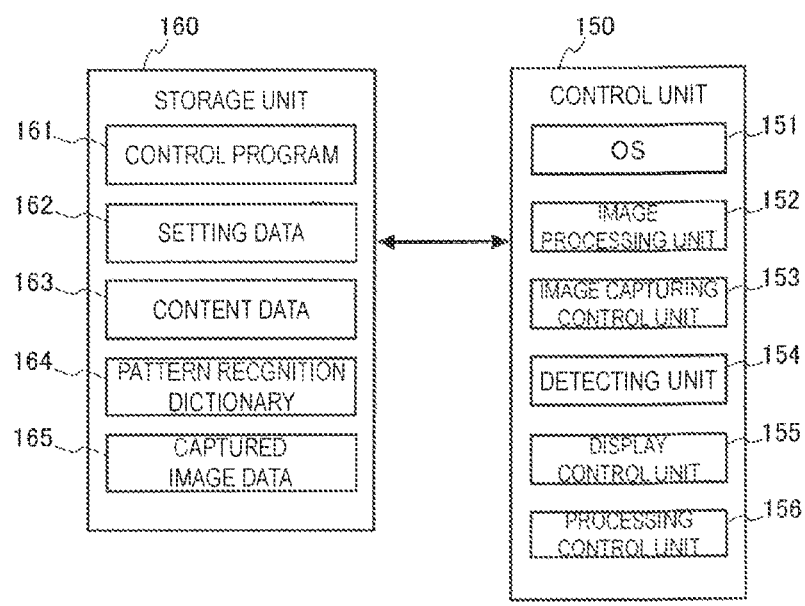
FIG. 5 is a functional block diagram of a control device.

The OLED unit. 221 includes an OILED panel 223 and an OLED driving circuit 225 that drives the OLED panel 223. The OLED panel 223 is a self-emitting display panel including light emitting elements arranged in a matrix. The light emitting elements respectively emit light of a corresponding one of colors red (R), green (G), and blue (B) by means of organic electroluminescence. The OLED panel 223 includes a plurality of pixels, each being a unit including one element for each of R, G, and B, and forms an image with the pixels arranged in a matrix. The OLED driving circuit 225 selects and energizes a light emitting unit in the OLED panel 223 so that the light emitting unit of the OLED panel 223 emits light, according to control performed by the control unit 150 (FIG. 5). The OLED driving circuit 225 is fixed to a back surface of the OLED panel 223, that is, a surface on the opposite side of a light emitting surface, by bonding or the like. For example, the OLED driving circuit 225 includes a semiconductor device that drives the OLED panel 223, and may be mounted on a substrate (not illustrated) fixed on the back surface of the OLED panel 223. A temperature sensor 217 is mounted on this substrate.

The OLED panel 223 may have a configuration where light emitting elements that emit white light are arranged in a matrix, and color filters corresponding to the colors R, G, and B are laid over the light emitting elements. Furthermore, the OLED panel 223 may have a WRGB configuration including a light emitting element emitting white (W) light in addition to the light emitting elements respectively emitting light of one of colors R, G, and B.

The right optical system 251 includes a collimate lens that causes the image light L emitted from the OLED panel 223 to be parallel light beams. The image light L, caused to be the parallel light beams by the collimate lens, is incident on the right light-guiding plate 26. A plurality of reflection surfaces that reflect the image light L are formed in an optical path that guides light in the right light-guiding plate 26. The image light L is reflected in the right light-guiding plate 26 for a plurality of times to be guided toward the right eye RE. The right light-guiding plate 26 has a half mirror 261 (reflection surface) positioned in front of the right eye RE. The image light L is reflected by the half mirror 261 and is emitted toward the right eye RE from the right light-guiding plate 26, to be a focused image on the retina of the right eye RE, so that the image is visually recognized by the user.

The left display unit 24 has a configuration, for making an image visually recognized by the left eye LE of the user, including: an OLED unit 241 that emits image light; and a left optical system 252 including a lens group that guides the image light L emitted by the OLED unit 241. The left optical system 252 guides the image light L to the left light-guiding plate 28.

The OLED unit 241 includes an OLED panel 243 and an OLED driving circuit 245 that drives the OLED panel 243. The OLED panel 243 is a self-emitting display panel having a configuration similar to that of the OLED panel 223. The OLED driving circuit 245 selects and energizes a light emitting unit in the OLED panel 243 so that the light emitting unit of the OLED panel 243 emits light, according to control performed by the control unit 150 (FIG. 5). The OLED driving circuit 245 is fixed to a back surface of the OLED panel 243, that is, a surface on the opposite side of a light emitting surface, by bonding or the like. For example, the OLED driving circuit 245 includes a semiconductor device that drives the OLED panel 243, and may be mounted on a substrate (not illustrated) fixed on the back surface of the OLED panel 243. A temperature sensor 239 mounted on this substrate.

The left optical system 252 includes a collimate lens that causes the image light L emitted from the OLED panel 243 to be parallel light beams. The image light L, caused to be the parallel light beams by the collimate lens, is incident on the left light-guiding plate 28. The left light-guiding plate 28 is an optical element, such as a prism in which a plurality of reflection surfaces that reflect the image light L are formed. The image light L is reflected in the left light-guiding plate 28 for a plurality of times to be guided toward the left eye LE. The left light-guiding plate 28 has a half mirror 281 (reflection surface) positioned in front of the left eye LE. The image light L is reflected by the half mirror 281 and is emitted toward the left eye LE from the left light-guiding plate 28, to be a focused image on the retina of the left eye LE, so that the image is visually recognized by the user.

The HMD 100 having this configuration functions as a see-through display device. Specifically, the image light L reflected by the half mirror 261 and external light OL transmitted through the right light-guiding plate 26 are incident on the right eye RE of the user. The image light L reflected by the half mirror 281 and the external light OL transmitted through the half mirror 281 are incident on the left eye LE. Thus, with the HMD 100, the image light L of an internally processed image and the external light OL are incident on the eye of the user in an overlapping manner. The user can see the outside scene through the right light-guiding plate 26 and the left light-guiding plate 28. Thus, an image, obtained from the image light L, overlapping with the outside scene or at the periphery of the outside scene is displayed to be visually recognized. The half mirrors 261 and 281 serve as image acquiring units that reflect the image light respectively output from the right display unit 22 and the left display unit 24 to acquire an image, and thus can be referred to as a display unit.

The left optical system 252 and the left light-guiding plate 28 are also collectively referred to as a "left light-guiding unit", and the right optical system 251 and the right light-guiding plate 26 are collectively referred to as a "right light-guiding unit". The configurations of the right light-guiding unit and the left light-guiding unit are not limited to the example described above, and may be any configuration as long as a virtual image is formed in front of the eyes of the user by using the image light. For example, a diffraction grating may be employed, or a semitransparent reflection film may be employed.

Referring back to FIG. 1, the control unit 10 and the image display unit 20 are connected to each other via a connection cable 40. The connection cable 40 is detachably connected to a connector (not illustrated) provided in a lower portion of the casing 10A, and establishes connection between a distal end of the left holding unit 23 and various circuits disposed in the image display unit 20. The connection cable 40 may include a metal cable or an optical fiber cable for transmitting digital data and may include a metal cable for transmitting an analog signal. A connector 46 is provided at an intermediate portion of the connection cable 40. The connector 46 is a lack for connecting a stereo mini plug, and is connected to the control device 10 through a line for transmitting an analog sound signal for example. In the configuration example illustrated in FIG. 1, a headset 30 including a right earphone 32, left earphone 34, and a microphone 63 are connected with the connector 46.

The control device 10 and the image display unit 20 may be in wireless connection. For example, a configuration may be adopted where the control device 10 and the image display unit 20 may transmit and receive a control signal and data to and from each other, by wireless communications conforming to standards such as Bluetooth (trade name) or a wireless local area network (WLAN including Wi-Fi (trade name)).

For example, as illustrated in FIG. 1, the microphone 63 has a sound collecting section arranged to face in the line of sight direction of the user, collects sound, and out a sound signal to a sound interface (I/f) 180 (FIG. 4). For example, the microphone 63 may be a monaural microphone, a stereo microphone, a directional microphone, or an omni-directional microphone.

Figure 3:
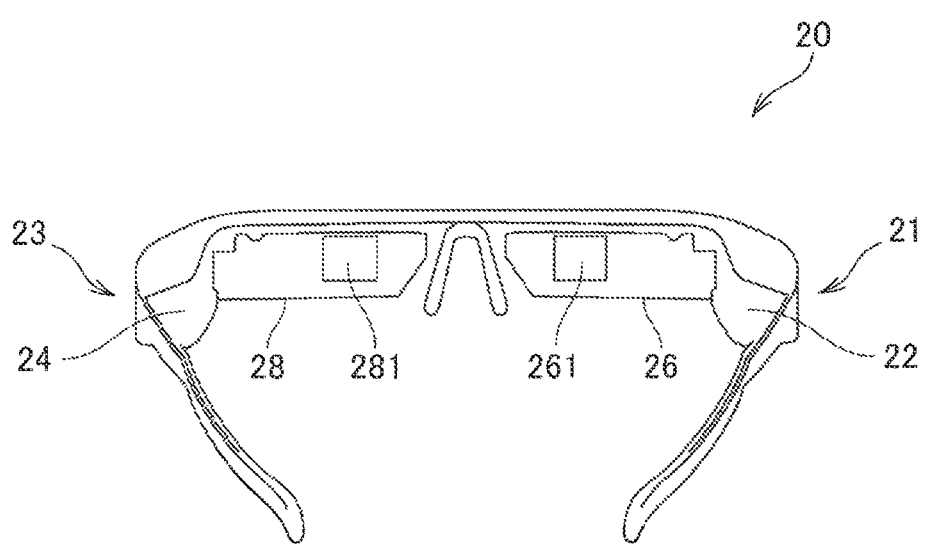
FIG. 3 is a perspective view illustrating a configuration of an image display unit.

FIG. 3 is a perspective view illustrating a configuration of the image display unit 20, and illustrates a configuration of main parts of the image display unit 20 as viewed from the side of the head of the user. FIG. 3 illustrates the image display unit 20 as viewed from a side in contact with the head of the user, that is, a side as viewed from the right eye RE and the left eye LE of the user. In other words, the back sides of the right light-guiding plate 26 and the left light-guiding plate 28 are illustrated.

In FIG. 3, the half mirror 261 and the half mirror 281 which respectively irradiate the right eye RE and the left eye LE with the image light are each illustrated as a substantially rectangular region. The right light-guiding plate 26 and the left light-guiding plate 28, respectively including the half mirrors 261 and 281, entirely transmit the external light as described above. Thus, the user visually recognizes the outside scene through the entire right and the left light-guiding plates 26 and 28, and visually recognizes a rectangular displayed image at positions of the half mirrors 261 and 281.

The first camera 61 is disposed at a right-side end portion of the image display unit 20, and captures an image in a viewing direction of both eyes of the user, that is, an image in front of the user. The second camera 62 is disposed in the boundary portion between the right and left light-guiding plates 26 and 28, and captures an image in front of the user. The first camera 61 and the second camera 62 each have an optical axis in a direction including the line of sight directions of the right eye RE and the left eye LE. The outside scene visually recognizable by the user wearing the HMD 100 is not necessarily at the infinite distance. For example, in a case that the user gazes at a target in front of him or her with both eyes, the distance between the user and the target is likely to be approximately from 30 cm to 10 m and is more likely to be from 1 m to 4 m. Thus, a reference may be set for the upper and the lower limits of the distance between the user and the target in normal use of the HMD 100. The reference may be determined through investigations or experiments, or may be set by the user. The optical axis and the angle of view of each of the first camera 61 and the second camera 62 may be set in such a manner that a target with a distance corresponding to the reference for the upper or the lower limit in normal use is included in the angle of view.

Generally, a view angle of a person is approximately 200 degrees in the horizontal direction and is approximately 125 degrees in the vertical direction. The view angle includes an effective visual field superior in information receiving performance that is approximately 30 degrees in the horizontal direction and approximately 20 degrees in the vertical direction. Further, the stable fixation viewing area in which the gaze point gazed by a person can promptly and stably be viewed is roughly in the range of 60 through 90 degrees in the horizontal direction, and in the range of 45 through 70 degrees in the vertical direction. In a case where the gaze point is at the target positioned in front of the user, a range of about 30 degrees in the horizontal direction and about 20 degrees in the vertical direction centered on the lines of sight of the right eye RE and the left eye LE corresponds to the effective visual field. Further, a range of 60 through 90 degrees in the horizontal direction and 45 through 70 degrees in the vertical direction corresponds to the stable fixation viewing area, and a range of about 200 degrees in the horizontal direction and about 125 degrees in the vertical direction corresponds to the view angle. The actual visual field visible for the user through the right light-guiding plate 26 and the left light-guiding plate 28 may also be referred to as a field of view (FOV). With the configuration according to the first exemplary embodiment illustrated in FIG. 1 and FIG. 2, an actual field of view corresponds to an actual visual field visually recognized by the user through the right light-guiding plate 26 and the left light-guiding plate 28. The actual field of view is narrower than the view angle and the stable fixation viewing area, but is broader than the effective visual field.

The first camera 61 and the second camera 62 each capture an image within a range including the outside scene that is visually recognizable together with an image displayed by the image display unit 20. The angle of view of the user of the first camera 61 and the second camera 62 may be configured to capture an image in a range broader than the visual field of the user. Specifically, the angle of view may be larger than at least the effective visual field of the user. The angle of view may be larger than the field of view of the user. The angle of view may be larger than the stable fixation viewing area of the user. The angle of view may be larger than the view angle of both eyes of the user.

The first camera 61 and the second camera 62 may include what is known as a wide-angle lens as an imaging lens, to be configured to be capable of capturing an image with a wide angle of view. The wide-angle lens includes lenses known as a super wide-angle lens and a semi wide-angle lens and may be a single focus lens or a zoom lens. Furthermore, the first camera 61 and the second camera 62 may be configured to include a lens group including a plurality of lenses.

FIG. 4 is a block diagram illustrating a configuration of components of the HMD 100.

The control device 10 includes the main processor 140 that executes a program and controls the HMD 100. The main processor 140 is connected to a memory 121 and a nonvolatile storage unit 123. Sensors including a 6-axis sensor 11 and a magnetic sensor 113 are connected to the main processor 140. Global Positioning System (GPS) receiver 115, a communication unit 117, a sound codec 182, an external connector 184, an external memory interface 186, a universal serial bus (USB) connector 188, a sensor hub 192, and a field programmable gate array (FPGA) 194 are further connected to the main processor 140. These components function as an interface with the outside. The LED indicator 12, an LED display unit 17, a vibrator 19, an operation unit 110, and the power source unit 130 are connected to the main processor 140.

The main processor 140 is mounted on a controller substrate 120 incorporated in the control device 10. In addition to the main processor 140, the memory 121, the nonvolatile storage unit 123, the 6-axis sensor 111, the magnetic sensor 113, the GPS receiver 115, the communication unit 117, the sound codec 182, and the like are also mounted on the controller substrate 120. In the first exemplary embodiment, the external connector 184, the external memory interface 186, the USB connector 188, the sensor hub 192, the FPGA 194, and an interface 196 are mounted on the controller substrate 120.

The memory 121 serves as a work area where a control program and data to be processed are temporarily stored, when the main processor 140 executes the control program. The nonvolatile storage unit 123 includes a flash memory and an embedded Multi Media Card (eMMC). The nonvolatile storage unit 123 stores a program executed by the main processor 140 and various types of data processed by main processor 140 executing the program.

FIG. 4 illustrates a configuration where a single main processor 140 implements the functions of the control device 10. Alternatively, the functions of the control device 10 may be implemented by a plurality of processors or semiconductor chips. For example, co-processors such as a System-on-a-Chip (SoC), a Micro Control Unit (MCU), a Field-Programmable Gate Array (FPGA), and the like may be further mounted on the controller substrate 120. The control device 10 may perform various types of control using both the main processor 140 and the co-processor cooperating, or selectively using one of the main processor 140 and the co-processor.

The 6-axis sensor 111 is a motion sensor (inertial sensor) including a 3-axis acceleration sensor and a 3-axis gyro (angular velocity) sensor. The 6-axis sensor 111 may employ an Inertial Measurement Unit (IMU) that is a module including the sensors described above. For example, the magnetic sensor 113 is a 3-axis geomagnetic sensor.

The 6-axis sensor 111 and the magnetic sensor 113 output detection values to the main processor 140 at a predetermined sampling cycle. The 6-axis sensor 111 and the magnetic sensor 113 also output the detection values to the main processor 140 at a timing designated by the main processor 140, in response to a request from the main processor 140.

The GPS receiver 115 includes a GPS antenna (not illustrated) to receive a GPS signal transmitted from a GPS satellite. The GPS receiver 115 outputs the received GPS signal to the main processor 140. The GPS receiver 115 measures a signal strength of the received. GPS signal, and outputs information of the signal strength to the main processor 140. Examples of the signal strength include information such as a Received Signal Strength Indication (RSSI), electric field intensity, magnetic field intensity, and Signal to Noise ratio (SNR).

The communication unit 117 performs wireless communications with external devices. The communication unit 117 includes an antenna, a radio frequency (RF) circuit, a baseband circuit, a communication control circuit, and the like, or is a device having these components integrated. The communication unit 117 performs wireless communications conforming to standards such as Bluetooth or WAN (including Wi-Fi).

The sound interface 180 is an interface that receives and outputs a sound signal. In the first exemplary embodiment, the sound interface 180 includes the connector 46 (FIG. 1) provided on the connection cable 40. The connector 46 is connected to a headset 30. The right earphone 32 and the left earphone 34 output sounds upon receiving the sound signal output from the sound interface 180. The microphone 63 of the headset 30 collects sounds and outputs the resultant sound signal to the sound interface 180. The sound signal input from the microphone 63 to the sound interface 180 is input to the external connector 184.

The sound codec 182 is connected to the sound interface 180 and encodes and decodes the sound signal received and output via the sound interface 180. The sound codec 182 may include an A/D converter that converts an analog sound signal to digital sound data and a D/A converter that performs the opposite conversion. For example, the HMD 100 according to the first exemplary embodiment outputs sounds with the right earphone 32 and the left earphone 34, and collects the sounds with the microphone 63. The sound codec 182 converts the digital sound data, output from the main processor 140, into an analog sound signal, and outputs the signal through the sound interface 180. The sound codec 182 also converts the analog sound signal input to the sound interface 180 into digital sound data, and outputs the data to the main processor 140.

The external connector 184 is a connector for connecting the main processor 140 with an external device that communicates with the main processor 140. For example, the external connector 184 is an interface for connecting an external device, for debugging a program executed by the main processor 140 and collecting logs of operations performed by the HMD 100, to the main processor 140.

The external memory interface 186 is an interface with which a portable memory device can be connected, and includes a memory card slot and an interface circuit, so that a card shaped recording medium is attached to read data, for example. With such a configuration, the size, the shape, and the standard of the card shaped recording medium are not limited and can be changed as appropriate.

The USB connector 188 include a connector and an interface circuit conforming to the USB standard. A USB memory device, a smartphone, a computer, and the like can be connected to the USE connector 188. The size and the shape of the USB connector 188 as well as the version of the corresponding USE standard can be selected and changed as appropriate.

The sensor hub 192 and the FPGA 194 are connected to the image display unit 20 via the interface 196. The sensor hub 192 acquires detection values from various sensors of the image display unit 20, and outputs the detection values to the main processor 140. The FPGA 194 performs processing of data transmitted and received to and from the components of the image display unit 20, and transmission of data via the interface 196.

The LED indicator 12 is turned ON and blinks in accordance with the operation status of the HMD 100. The LED display unit 17 controls the LED indicator 12 to turn ON and OFF, according to control performed by the main processor 140. The LED display unit 17 may include an LED (not illustrated) disposed immediately below the trackpad 14 and a driving circuit that turns ON the LED. With this configuration, the LED display unit 17 turns ON/OFF the LED or makes the LED blink, according to control performed by the main processor 140.

The vibrator 19 may include a motor and an eccentric rotor (none of which are illustrated) as well as any other required components. The vibrator 19 rotates the motor according to control performed by the main processor 140 to produce vibrations. For example, the HMD 100 vibrates in a predetermined vibration pattern by means of the vibrator 19, upon detecting an operation on the operation unit 110, when the HMD 100 is turned ON or OFF, or in other situations.

The operation unit 110 includes the operator 13 and the trackpad 14. The operator 13 includes the operation buttons 11, the up and down keys 15, the changeover switch 16, and the power switch 18. When the operator 13 or the trackpad 14 receives an operation, the operation unit 110 outputs an operation signal to the control unit 150. The operation signal includes identification information of the operator 13 or the trackpad 14 that has received the operation and information of the received operation content.

The control device 10 includes the power source unit 130, and operates with power supplied from the power source unit 130. The power source unit 130 includes a rechargeable battery 132 and a power source control circuit 134 that detects a remaining battery level of the battery 132 and controls charging of the battery 132. The power source control circuit 134 is connected to the main processor 140, and outputs a detection value indicating the remaining battery level of the battery 132 or a voltage detection value to the main processor 140. The control device 10 may supply power to the image display unit 20, based on power supplied by the power source unit 130. The main processor 140 may be configured to control a status of power supply from the power source unit 130 to the components of the control device 10 and the image display unit 20.

The right display unit 22 and the left display unit 24 of the image display unit 20 are each connected to the control device 10. As illustrated in FIG. 1, the HMD 100 includes the connection cable 40 connected to the left holding unit 23, wiring leading to the connection cable 40 provided in the image display unit 20, and the right display unit 22 and the left display unit 24 each connected to the control device 10.

The right display unit 22 includes a display unit substrate 210. An interface 211 connected to the interface 196, a receiver (Rx) 213 that receives data input from the control device 10 via the I/F 211, and an Electrically Erasable Programmable Read-Only Memory (EEPROM) 215 are mounted on the display unit substrate 210.

The receiver 213, the EEPROM 215, the temperature sensor 217, the first camera 61, the second camera 62, an illuminance sensor 65, and an LED indicator 67 are connected to the control device 10 via the interface 211.

The EEPROM 215 stores various types of data to be readable by the main processor 140. For example, the EEPROM 215 stores data on light emission characteristics and display characteristics of the OLED units 221 and 241 of the image display unit 20, data on characteristics of the sensors of the right display unit 22 or the left display unit 24, and the like. More specifically, the stored data includes parameters related to gamma correction for the OLED units 221 and 241, data for compensating the detection values obtained by the temperature sensors 217 and 239, and the like. The data are generated during inspection performed before the HMD 100 is shipped from the factory and are written to the EEPROM 215 so that the main processor 140 can use the data in the EEPROM 215 to execute processing after the shipping.

The first camera 61 and the second camera 62 each capture an image according to a signal received via the interface 211, and output captured image data or a signal indicating an image capturing result to the control device 10.

As illustrated in FIG. 1, the illuminance sensor 65 is provided on the end portion ER of the front frame 27 and is configured to receive external light from the front side of the user wearing the image display unit 20. The illuminance sensor 65 outputs a detection value corresponding to the amount (intensity) of the received light.

As illustrated in FIG. 1, the LED indicator 67 is disposed around the first camera 61 in the end portion ER of the front frame 27. The LED indicator 67 is ON while the first camera 61 or the second camera 62 is capturing an image, and thus indicates that image capturing is being performed.

The temperature sensor 217 detects a temperature, and out a detection value that is a voltage value or a resistance value corresponding to the detected temperature. The temperature sensor 217 is mounted on the back surface side of the OLED panel 223 (FIG. 2). For example, the temperature sensor 217 may be mounted on a substrate on which the OLED driving circuit 225 is also mounted. With this configuration, the temperature sensor 217 mainly detects the temperature of the OLED panel 223.

The receiver 213 receives data transmitted by the main processor 140 via the interface 211. Upon receiving image data on an image to be displayed on the OLED unit 221, the receiver 213 outputs the received image data to the OLED driving circuit 225 (FIG. 2).

The left display unit 24 includes a display unit substrate 230. An interface (I/F) 231 connected to the interface 196 and a receiver (Rx) 233 that receives data input from the control device 10 via the interface 231 are mounted on the display unit substrate 230. A 6-axis sensor 235 and a magnetic sensor 237 are also mounted on the display unit substrate 210. The interface 231 connects the receiver 233, the 6-axis sensor 235, the magnetic sensor 237, and the temperature sensor 239 to the control device 10.

The 6-axis sensor 235 is a motion sensor (inertial sensor) including a 3-axis acceleration sensor and a 3-axis gyro (angular velocity) sensor. The 6-axis sensor 235 may employ IMU that is a module including the sensors described above. For example, the magnetic sensor 237 a 3-axis geomagnetic sensor.

The temperature sensor 239 detects a temperature, and outputs a detection value that is a voltage value or a resistance value corresponding to the detected temperature. The temperature sensor 239 is mounted on the back surface side of the OLED panel 243 (FIG. 2). For example, the temperature sensor 239 may be mounted on a substrate on which the OLED driving circuit 245 is also mounted. With this configuration, the temperature sensor 239 mainly detects the temperature of the OLED panel 243. The temperature sensor 239 may be incorporated in the OLED panel 243 or the OLED driving circuit 245. The substrate may be a semiconductor substrate. Specifically, when the OLED panel 243 as a Si-OLED is mounted on an integrated semiconductor chip together with the OLED driving circuit 245 and the like as an integrated circuit, the temperature sensor 239 may be mounted on the semiconductor chip.

The first camera 61, the second camera 62, the illuminance sensor 65, and the temperature sensor 217 of the right display unit 22 as well as the 6-axis sensor 235, the magnetic sensor 237, and the temperature sensor 239 of the left display unit 24 are connected to the sensor hub 192.

The sensor hub 192 sets and initializes the sampling cycle of the sensors according to control performed by the main processor 140. The sensor hub 192 energizes the sensors, transmits control data to the sensors, acquires the detection values from the sensors, and performs other operations, based on the sampling cycles of the sensors. The sensor hub 192 outputs the detection value, acquired from each of the sensors of the right display unit 22 and the left display unit 24, to the main processor 140 at a timing set in advance. The sensor hub 192 may have a function of temporarily holding the detection value acquired from each sensor, based on a timing at which the value is output to the main processor 140. The sensor hub 192 may have a function of converting output values from the sensors with different signal formats or data formats into data with a unified data format, and transmit the data to the main processor 140.

The sensor hub 192 starts and stops energizing the LED indicator 67 according to control performed by the main processor 140, and causes the LED indicator 67 to be turned ON or to blink at a timing when the first camera 61 starts or stops the image capturing.

FIG. 5 is a functional block diagram illustrating a storage unit 160 and a control unit 150 forming a control system of the control device 10. The storage unit 160 illustrated in FIG. 5 is a logical storage unit formed of the nonvolatile storage unit 123 (FIG. 4), and may include the EEPROM 215 and the memory 121. The control unit 150 and various functional units of the control unit 150 are implemented through a cooperation between software and hardware, when the main processor 140 executes a program. For example, the control unit 150 and various functional units of the control unit 150 include the main processor 140, the memory 121, and the nonvolatile storage unit 123.

The storage unit 160 stores a control program executed by the control unit 150 and various types of data processed by the control unit 150. Specifically, the storage unit 160 stores a control program 161, setting data 162, content data 163, a pattern recognition dictionary 164, captured image data 165, and the like.

The control program 161 is an application program having a particular function executed on an Operating System (OS) 151. For example, the application program includes browser software, a business program, an office program such as word processing software and spreadsheet software, and the like. The application program includes a program for detecting a gesture defined by the movement, shape, and position of a hand of the user, and executing processing associated with the detected gesture. An operation performed when the control unit 150 executes the application program will be described in detail later.

The setting data 162 includes various setting values for configuring the operation performed by the HMD 100. In a case where the control unit 150 uses a parameter, determinant, formula, Lockup Table (LUT), and the like to control the HMD 100, the setting data 162 may include such data.

The content data 163 is data on contents including a display image or video to be displayed by the image display unit 20 based on control performed by the control unit 150, and includes image data or video data. The content data 163 may include music or sound data.

The content data 163 may be data on bidirectional contents. Specifically, the image display unit 20 displays image data or video date in the content data 163, the operation unit 110 receives an operation on the image data or the video data displayed, and the control unit 150 executes processing corresponding to the received operation. In this case, the content data 163 may include image data on a menu screen displayed for receiving operations, data for determining processing corresponding to an item on the menu screen, and the like.

The pattern recognition dictionary 164 is a dictionary in which information for identifying a gesture and processing executed by the control unit 150 are registered while being associated with each other. The gesture is a predetermined movement or a shape of a hand (in this specification, the "hand" is a part from a wrist to a tip of a finger). The gesture may include an operation designating a predetermined position of the display region VR with a hand of the user.

For example, the gesture may be assumed to be a left to right movement of the hand. In this case, information indicating a movement direction of the hand is registered as the information for identifying the gesture in the pattern recognition dictionary 164. Further, the gesture may be assumed to be an operation of opening a gripped hand, that is, an operation of changing the shape of the hand from a gripped state to an open state. In such a case, information indicating the shape of the gripped hand, information indicating the shape of the open hand, and information indicating a detection order of these pieces of information indicating the shapes are registered in the pattern recognition dictionary 164. In a case that the gesture is assumed to be an operation indicating a predetermined position in the display region VR by the hand, for example, information indicating a position or a range in the display region VR to be indicated by the hand is registered in the pattern recognition dictionary 164. For example, the control unit 150 determines that the gesture has been detected, in a case where the position indicated by the hand of the user is determined to be the position or the range corresponding to four corners of the display region VR.

The processing registered in the pattern recognition dictionary 164 in association with the information for identifying the gesture includes processing of controlling the device as the control target and processing such as search and video playback performed by executing an application program.

The information registered in the pattern recognition dictionary 164 can be updated. For example, association between the information for identifying the gesture and the processing executed by the control unit 150 can be changed. The information for identifying the gesture may be downloaded from a server device (not illustrated) on the Internet. The user operates the operation unit 110 to associate the downloaded information for identifying the gesture with the desired processing to be executed by the control unit 150. The control unit 150 registers the information for identifying the gesture and the desired processing to be executed by the control unit 150 in association with each other, according to the operation received through the operation unit 110.

The captured image data 165 is data on an image captured by at least one of the first camera 61 and the second camera 62. The captured image data 165 is temporarily stored in the storage unit 160, and is deleted from the storage unit 160 when the processing by the control unit 150 is terminated, for example. Captured image data obtained by the first camera 61 corresponds to a "captured image" according to the invention.

The control unit 150 executes various types of processing by using data stored in the storage unit 160, to control the HMD 100. The control unit 150 includes the operating system. (OS) 151, an image processing unit 152, an image capturing control unit 153, a detecting unit 154, a display control unit 155, and a processing control unit 156 as functional blocks. The functional blocks are blocks representing functions implemented when the main processor 140 executes a control program only for the sake of description, and do not represent any particular application program or hardware.

The function of the OS 151 is a function of the control program stored in the storage unit 160, and is a function of an application program executed on the OS 151.

For example, the image processing unit 152 reads content data 163 from the storage unit 160, and extracts synchronization signals, such as a vertical synchronization signal VSync and a horizontal synchronization signal HSync, from the content data 163 thus read. The image processing unit 152 generates a clock signal PCLK by using a Phase Locked Loop (PLL) circuit and the like (not illustrated), based on cycles of the vertical synchronization signal VSync and the horizontal synchronization signal HSync extracted. The image processing unit 152 may execute various types of image processing including, for example, resolution conversion, luminance and/or saturation adjustment, and 2D/3D conversion, as appropriate.

The image processing unit 152 develops the image data subjected to the image processing, onto a DRAM in the storage unit 160 for each frame which is a unit for displaying an image. An area of the DRAM on which one frame of the image data is developed is hereinafter referred to as a frame area. The image processing unit 152 reads image data from a frame area, and outputs the read image data, as the display image data, to the image display unit 20.

The image processing unit 152 may be implemented by the main processor 140 executing a program or may be implemented in hardware (a digital signal processor (DSP) for example) different from the main processor 140.

The image capturing control unit 153 performs control to cause the first camera 61 and the second camera 62 to capture an image and generate captured image data. The image capturing control unit 153 temporarily stores the captured image data thus generated, in the storage unit 160. When the first camera 61 and the second camera 62 are each formed as a camera unit including a circuit that generates captured image data, the image capturing control unit 153 acquires the captured image data from the first camera 61 or the second camera 62, and temporarily stores the captured image data in the storage unit 160.

The detecting unit 154 detects the movement of the indication body based on the captured image data obtained by the first camera 61, to receive the operation based on the detected movement of the indication body.

The operation received by the detecting unit 154 is an operation based on the predetermined movement of the indication body. The movement of the indication body includes an operation of moving the indication body in an up and down direction or a right and left direction, an operation of rotating the indication body, and the like. The detecting unit 154 detects the movement of the indication body based on the captured image data obtained by the first camera 61, and determines whether the detected movement of the indication body corresponds to the predetermined movement of the indication body. The detecting unit 154 receives the operation based on the movement of the indication body, when the detected movement of the indication body corresponds to the predetermined movement of the indication body. Upon receiving the operation, the detecting unit 154 executes the processing associated with the predetermined movement of the indication body.

First, the detecting unit 154 reads out the captured image data obtained by the first camera 61 from the storage unit 160, and detects the indication body in the captured image data that has been read out. Then, the detecting unit 154 detects the indication body in pieces of the captured image data successively obtained by the first camera 61 to detect at least one of the movement, the shape, and the position of the indication body. The detecting unit 154 receives an operation based on at least one of the detected movement, the shape, and the position of the indication body.

In the description of the first exemplary embodiment, a case that the indication body is a hand of the user has been described. However, the indication body is not limited to the hand of the user. For example, a part of the body such as a finger or an arm of the user, an indication body held by the user's hand, or a detection target object attached to the body may be used. Furthermore, a ring worn on a finger of the user, or a watch, a band, or the like worn on the user's arm may be used as the indication body. When an indication bar, a watch, a band, or the like is used as the indication body, image data on such an indication body is stored in the storage unit 160 in advance, and the indication body is detected by a method such as a pattern matching.

The detecting unit 154 detects a region that the image of the user's hand has been captured (hereinafter, referred to as a hand region) in the captured image data. For example, the detecting unit 154 detects the hand region by executing skin color extraction processing to extract a skin color region in the region of the captured image data, and executing threshold processing to compare a pixel value of the extracted skin color region with a threshold. The detecting unit 154 may execute edge detection processing to extract the obtained contour of the hand region, and detect the shape or the position of the hand by feature point matching based on protrusions and recesses on the contour or curvature determination. Upon detecting the hand region in the captured image data, the detecting unit 154 instructs the display control unit 155 to display an object 300. The object 300 will be described with reference to FIG. 6.

The detecting unit 154 detects the hand region from each captured image data successively obtained by the first camera 61 or each predetermined pieces of captured image data, to detect the movement, the shape, or the position of the hand region. When the movement, the shape, or the position of the hand region is detected, the detecting unit 154 refers to the pattern recognition dictionary 164 based on the detected movement, shape, or position of the hand region to identify the gesture corresponding to the detected movement of the hand region. The detecting unit 154 identifies the gesture corresponding to the movement, the shape, or the position of the hand region to receive an operation based on at least one of the movement, the shape, or the position of the indication body. When the gesture is identified and thus the operation is received, the detecting unit 154 acquires the processing associated with the identified gesture from the pattern recognition dictionary 164. The detecting unit 154 causes the processing control unit 156 to execute the processing associated with the gesture thus acquired.

The display control unit 155 generates a control signal for controlling the right display unit 22 and the left display unit 24, and uses the control signal thus generated to control generation and emission of image light from each of the right display unit 22 and the left display unit 24. Specifically, the display control unit 155 controls the OLED driving circuits 225 and 245 to cause the OLED panels 223 and 243 to display an image. The display control unit 155 controls a timing of rendering on the OLED panels 223 and 243 by the OLED driving circuits 225 and 245, controls the luminance on the OLED panels 223 and 243, and performs other control based on the signal output from the image processing unit 152.

The display control unit 155 determines whether the detecting unit 154 is ready to receive an operation, and displays a determination result. Specifically, the display control unit 155 determines whether the HMD 100 is ready to receive an operation, when the detecting unit 154 has detected the indication body. When it is determined that the operation can be received, the display control unit 155 controls the image display unit 20 to display an indication indicating that the operation can be received, on the display region VR.

Figure 6:
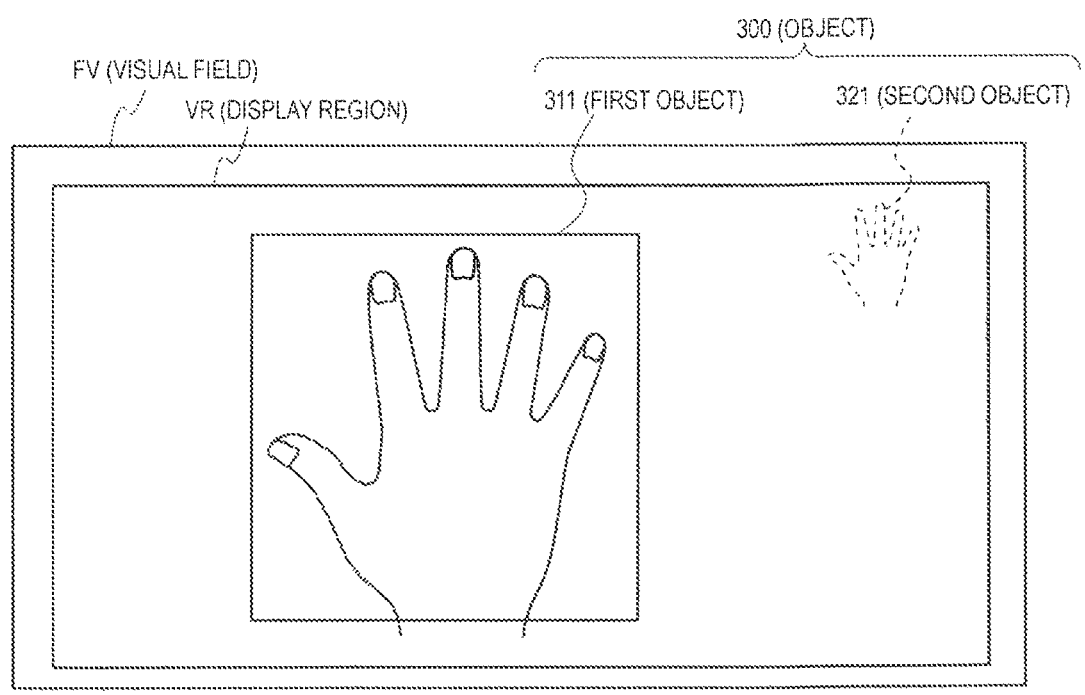
FIG. 6 is a diagram illustrating a visual field range of a user.

FIG. 6 is a diagram illustrating the visual field range PV of the user wearing the image display unit 20 on his or her head.

The display control unit 155 displays the predetermined object. 300 such as, an image, a text, a figure, a sign, a mark, an icon, and the like in the display region VR when the detecting unit 154 has detected the indication body. When the indication body is detected by the detecting unit 154 and the detecting unit 154 is ready to receive the operation of the indication body, the display control unit 155 changes the display mode of the object 300 such as the displayed image, text, figure, sign, mark, or icon. For example, the display control unit 155 determines that the detecting unit 154 is ready to receive the operation when the indication body is detected and other processing with large load such as image processing is not being executed.

FIG. 6 illustrates a case where a first object 310 and a second object 320 are displayed as the object 300. In the first exemplary embodiment, a case is illustrated where a range image 311 indicating a range of the hand region is displayed as the first object 310, and an image 321 (hereinafter, referred to as an icon) simulating the shape of the indication body is displayed as the second object 320. The range image 311 corresponds to an "image overlapping with the indication body" according to the invention.

The range image 311 serving as the first object 310 is an image indicating a range of the user's hand detected in the captured image data. The range image 311 is displayed in the display region VR by the display control unit 155, when the hand region has been detected in the captured image data. The display control unit 155 erases the range image 311 from the display region VR, when the hand region is no longer detected in the captured image data.

The display control unit 155 may display the range image 311 surrounding the periphery of the hand region detected by the detecting unit 154, and may display the range image 311 overlapping with a part of the hand region. The shape of the range image 311 may be rectangular, circular, or polygonal, and may also be a shape matching the body shape.

The user can determine whether the object detected by the HMD 100 as the indication body is a hand by displaying the range image 311 on the display region VR. Thus, when the HMD 100 detects an incorrect object as the hand, the HMD 100 performs the indication body detection again, so that erroneous operation can be prevented from being performed.

The icon 321 serving as the second object 320 indicates a state of the HMD 100, and indicates that the hand region has been detected and that the HMD 100 is ready to receive the operation by the gesture. In the description of the first exemplary embodiment, the icon 321 simulating the shape of a hand serving as the indication body is displayed as the second object 320. For example, when the indication body is an indication bar, an icon indicating the shape of the indication bar may be displayed as the second object 320. In the description of the first exemplary embodiment, the icon 321 is displayed as the second object 320. Note that the second object 320 is not limited to icons, and may be an image, a text, a figure, a sign, or a mark.

The display control unit 155 changes the display mode of the second object 320. For example, the second object 320 is displayed on the display region VR together with the start of the application program. The display control unit 155 changes the display mode of the second object 320 so that the visibility of the second object 320, when the control unit 150 is ready to receive the operation, can be higher than the visibility in other cases. The other cases include a case where no hand region is detected in the captured image data and a case where the hand region is detected but the control unit 150 is not ready to receive the operation.

For example, the display control unit 155 can change the display mode of the second object 320 by changing the transmittance of the second object 320. When the hand region is detected and the control unit 150 is ready to receive the operation, the display control unit 155 sets the transmittance of the second object 320 to be lower than the transmittance of the second object 320 in the other cases. The second object 320 is displayed to be noticeable in contrast to the outside scene of the display region VR if the transmittance of the second object 320 is set to be low. The second object 320 is displayed to be less noticeable in contrast to the outside scene of the display region VR if the transmittance of the second object 320 is set to be high.

The display control unit 155 can change the display mode of the second object 320 by changing the color of the second object 320. When the hand region is detected and the control unit 150 is ready to receive the operation, the display control unit 155 changes the color of the second object 320 to be more noticeable than the color of the second object 320 in the other cases. For example, the second object 320 is displayed in a white color when the hand region is detected and the control unit 150 is ready to receive the operation, and is displayed in a black color in other cases. The display control unit 155 may turn ON a display of the second object 320 when the hand region is detected and the control unit 150 is ready to receive the operation, and may turn OFF a display of the second object 320 in other cases.

FIG. 6 illustrates the state where the first object 310 and the second object 320 are displayed as the object 300. Note that only one of the first object 310 and the second object 320 may be displayed, and the object 300 may be displayed in combination with other display modes such as that using the LED indicators 12 and 67 for example. For example, the first object 310 may be displayed on the display region VR while the LED indicator 12 is turned ON. FIG. 6 illustrates the state where the first object 310 and the second object 320 are displayed as the object 300. Note that a text such as "A HAND IS DETECTED" may be displayed in the display region VR for example. A sign or a mark indicating that the hand is detected may be displayed as the object 300.

The processing control unit 156 controls an operation of a device as a control target, according to control performed by the detecting unit 154. The processing control unit 156 executes an application program to execute processing, according to control performed by the detecting unit 154. Examples of the device controlled by the processing control unit 156 include the second camera 62, the microphone 63, the 6-axis sensors 111 and 235, the magnetic sensors 113 and 237, the temperature sensors 217 and 239, the illuminance sensor 65, the LED indicators 12 and 67, and the like. Examples of the processing executed by executing an application program include processing of playing the content data 163 such as a movie or music. The processing executed by executing an application program further includes processing of starting browser software as the application program and processing of executing a search based on a keyword input to a search field of the browser software.

Figure 7:
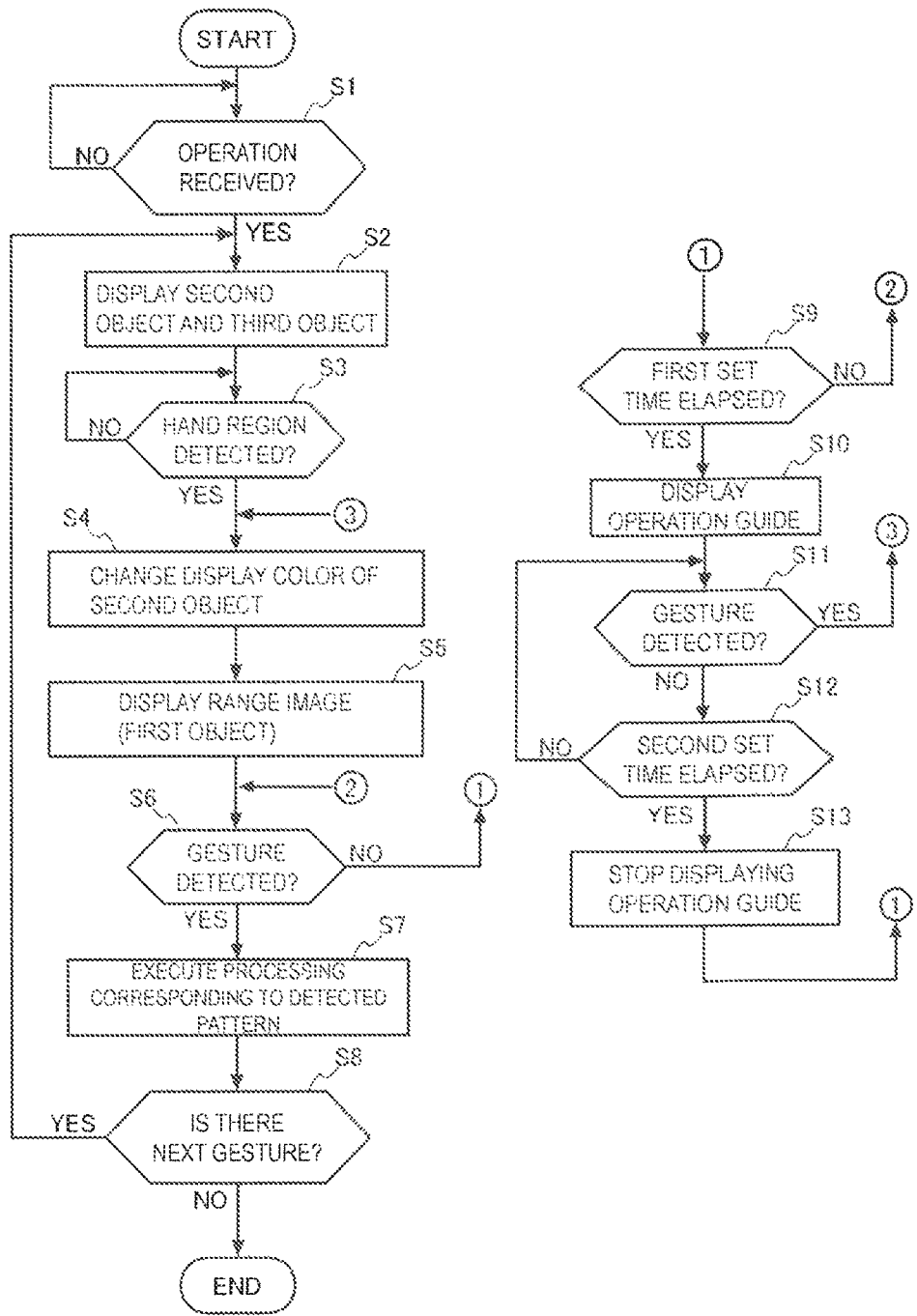
FIG. 7 is a flowchart illustrating processing executed by a control unit.

FIG. 7 is a flowchart illustrating processing executed by the control unit 150.

The processing executed by the control unit. 150 is described with reference to the flowchart in FIG. 7. First of all, the control unit 150 determines whether an operation of stating the application program has been received. (step S1). In step S1, the control unit 150 determines whether the operation of starting the application program for controlling the HMD 100 by a gesture (hereinafter, simply referred to as an operation) is received. The control unit 150, When not ready to receive the operation (step S1/NO), stands by for the start of the processing until the control unit 150 is ready to receive the operation, and executes other executable processing if there is any.

When the operation is received (step S1/YES), the control unit 150 starts the application program, and causes the second object 320 and a third object 330 to be displayed on the displayed region VR (step S2).

Figure 8:
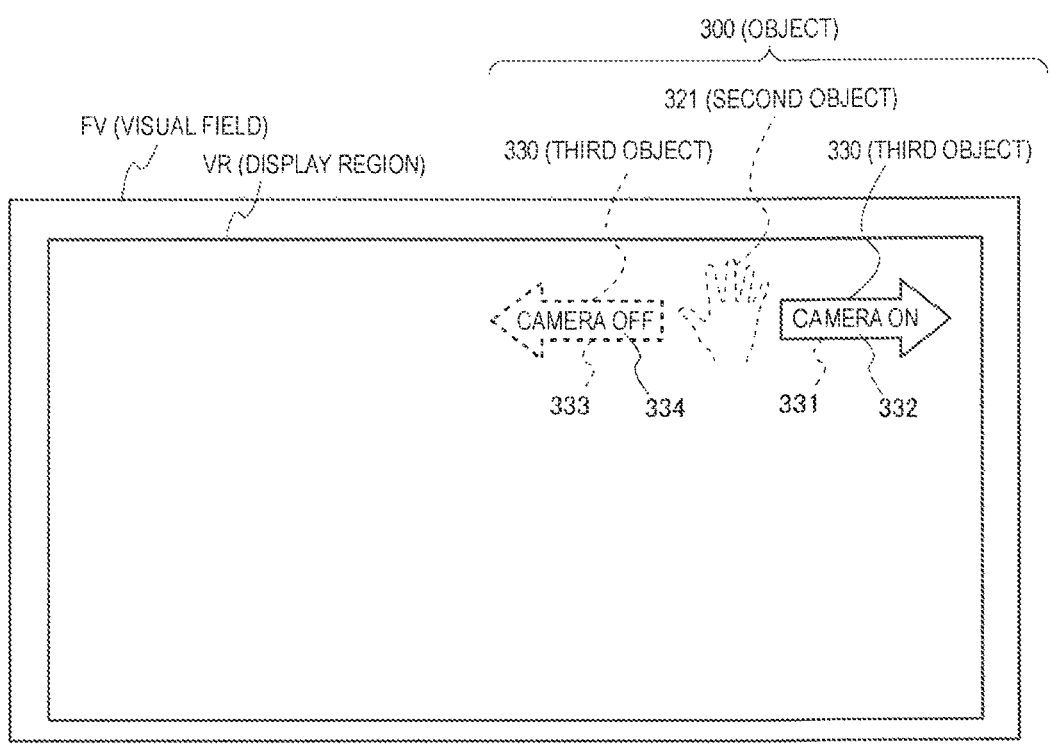
FIG. 8 is a diagram illustrating a display state of a display region.

FIG. 8 is a diagram illustrating a display state of the display region VR. Specifically, FIG. 8 is a diagram illustrating a state where the second object 320 and the third object 330 are displayed as the object 300 in the display region VR.

In the state illustrated in FIG. 8, the second object 320 and the third object 330 are displayed at upper right positions in the display region VR. Note that the second object 320 and the third object 330 may also be displayed at other positions such as upper left, lower right, and lower left positions in the display region. VR. The second object 320 and the third object 330 may be displayed at predetermined positions in the display region VR. The user can find the second object 320 and the third object 330 with smaller effort, by always displaying the second object 320 and third object 330 at the same positions.

The third object 330 is an image indicating a gesture to be detected by the control unit 150, and has the display mode changing based on the state of the device as the control target.

The control unit 150 causes arrow image 331 and 333, indicating directions of the movement of the indication body serving as the gesture, as well as texts 332 and 334 indicating the control target and the control operation, to be displayed in the display region VR. The text 332 indicating the control target and a control operation is displayed in the arrow image 331. Similarly, the text 334 indicating the control target and a control operation is displayed in the arrow image 333. The arrow image 331 indicates a right direction in the display region VR as viewed from the user. The arrow image 333 indicates a left direction in the display region VR as viewed from the user.

The texts 332 and 334 indicating the control target indicates the name of the device as control target of the control unit 150. The texts 332 and 334 indicating the control operation indicates the control operation performed by the control unit 150 to the control target. In the first exemplary embodiment, the texts 332 and 334 indicating the control target are "CAMERA". The arrow image 331, indicating the right direction in the display region VR, includes a text "ON" as the text 332 indicating the control operation. The arrow image 333, indicating the right direction in the display region VR, includes a text "OFF" as the text 332 indicating the control operation. The control unit 150 turns ON the second camera 62 when a gesture of moving the hand from left to right as viewed from the user is detected. The control unit 150 turns OFF the second camera 62 when a gesture of moving the hand from right to left as viewed from the user is detected.

The control unit 150 changes the display mode of the third object 330 according to the state of the device as the control target. When the second camera 62 is OFF, the control unit 150 sets a value of the transmittance of the arrow image 331 to be lower than the transmittance of the arrow image 331 when the second camera 62 is ON. Thus, when the second camera 62 is OFF, the arrow image 331 has a lower transmittance to be noticeable in contrast to the outer scene in the display region VR, and thus high visibility of the arrow image 331 is achieved. The control unit 150 may set the display color of the arrow image 331 to be different between the cases where the second camera 62 is ON and OFF. The control unit 150 causes the arrow image 331 to be displayed with a less noticeable color such as gray when the second camera 62 is ON, and causes the arrow image 331 to be displayed with a noticeable color such as white when the second camera 62 is OFF.

When the second camera 62 is ON, the control unit 150 sets a value of the transmittance of the arrow image 333 to be lower than the transmittance of the arrow image 333 when the second camera 62 is OFF. Thus, when the second camera 62 is ON, the arrow image 333 has a lower transmittance to be noticeable in contrast to the outer scene in the display region VR, and thus high visibility of the arrow image 333 is achieved. The control unit 150 may set the display color of the arrow image 333 to be different between the cases where the second camera 62 is ON and OFF. The control unit 150 causes the arrow image 333 to be displayed in a less noticeable color such as gray when the second camera 62 is ON, and causes the arrow image 333 to be displayed in a noticeable color such as white when the second camera 62 is OFF.

In the first exemplary embodiment, the arrow images 331 and 333 and the texts 332 and 334, indicating the control target and the control operation, are illustrated as examples of the third object 330. Note that the third object 330 is not limited to an image, and may be a figure, a sign, a mark, or an icon.

After causing the second object 320 and the third object 330 to be displayed in the display region VR, the control unit 150 reads out the captured image data as a processing target from the storage unit 160. In this example, among the pieces of captured image data in which the hand region detection has not been completed, the captured data obtained at the earliest time is read out. The control unit 150 executes the skin color extraction processing and the threshold processing with respect to the read out captured image data to detect the hand region (step S3). When no hand region is detected (step S3/NO), the control unit 150 reads out the captured image data as the next processing target from the storage unit 160, and executes the skin color extraction processing and the threshold processing with respect to the read out captured image data to detect the hand region (step S3). The control unit 150 may perform the hand region detection considering all of the pieces of captured image data obtained by the first camera 61 as the processing target, and may perform the hand region detection by selecting the captured image data as the processing target at predetermined intervals. The control unit 150 selects, as the next processing target, captured image data obtained immediately after captured image data selected as the processing target, or captured image data obtained after predetermined pieces of captured image data are obtained from the captured image data selected as the processing target.

When the hand region is detected in the captured image data (step S3/YES), the control unit 150 changes the display color of the second object 320 displayed in the display region VR (step S4). Thus, the visibility of the second object 320 can be higher than the visibility of the second object 320 before the hand region is detected. The control unit 150 displays the range image 311, corresponding to the hand region detected in the captured image data, in the display region VR (step S5).

Figure 9:
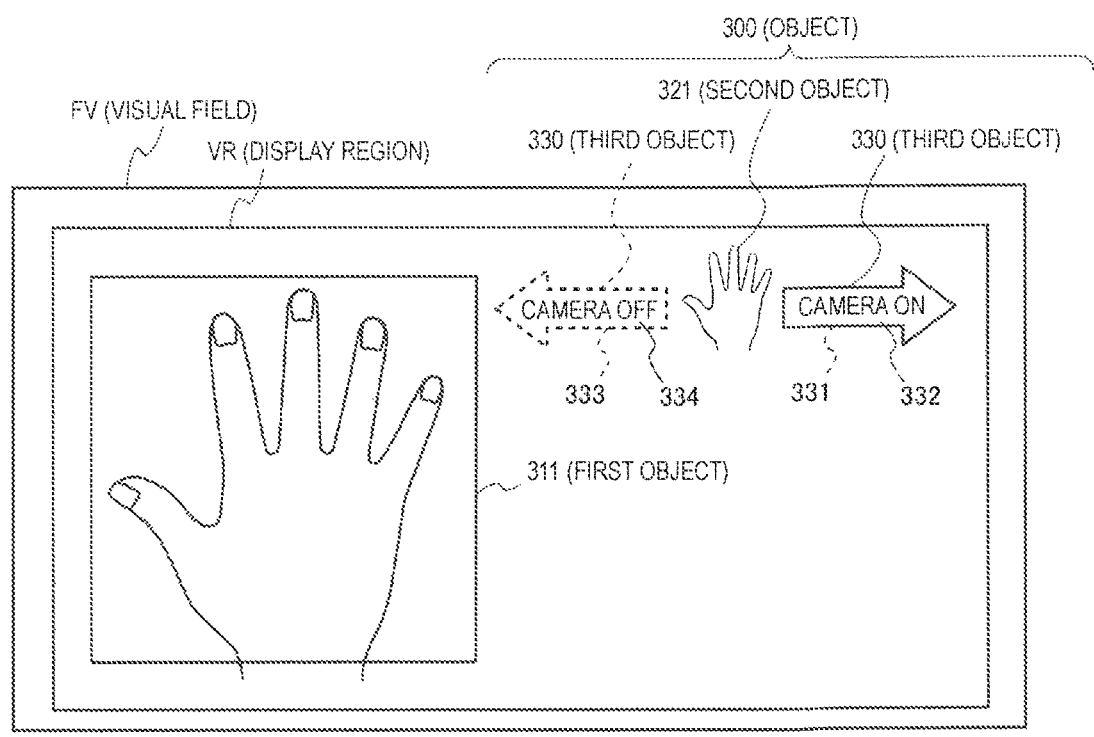
FIG. 9 is a diagram illustrating a display state of the display region.

FIG. 9 is a diagram illustrating a display state of the display region VR. More specifically, FIG. 9 is a diagram illustrating an example of the range image 311.

Upon detecting the hand region in the captured image data, the control unit 150 determines the display position where the range image 311 is displayed, based on the hand region detected. For example, the display position of the range image 311 may be set to surround the periphery of the detected hand region, or to be overlapped with a part of the hand region. Upon setting the display position of the range image 311, the control unit 150 causes the range image 311 serving as the first object 310 to be displayed at a position in the display region VR corresponding to the set display position (step S5).

Upon causing the range image 311 to be displayed in the display region. VR, the control unit 150 analyzes the pieces of captured image data successively obtained by the first camera 61 to detect the gesture. Specifically, the gesture indicated by the image of the third object 330 displayed in the display region VR is a detection target. More specifically, the gesture of moving the hand from left to right as viewed from the user is the gesture as the detection target, when the second camera 62 is OFF. The gesture of moving the hand from right to left as viewed from the user is the gesture as the detection target, when the second camera 62 is ON.

The control unit 150 determines whether the position of the detected hand region has changed by detecting the hand region in each of pieces of captured image data successively obtained by the first camera 61. When the position of the hand region has changed, the control unit 150 determines whether the change in the position of the hand region corresponds to the gesture registered in the pattern recognition dictionary 164. When the change in the position of the hand region corresponds to the gesture registered in the pattern recognition dictionary 164, the control unit 150 determines that the gesture has been detected (step S6). When the gesture has been detected, the control unit 150 acquires processing corresponding to the pattern of the detected gesture from the pattern recognition dictionary 164. Upon acquiring the information of the processing corresponding to the pattern of the gesture, the control unit 150 executes the processing indicated by the information of the acquired processing (step S7). For example, the control unit 150 turns ON the second camera 62 when the second camera 62 has not been turned ON and the gesture of moving the hand left to right as viewed from the user is detected.

After executing the processing corresponding to the gesture (step S7), the control unit 150 determines whether there is a gesture associated with an operation that can be subsequently received. (step S8). Par example, when the second camera 62 is turned ON in step S7, it is determined whether there is a gesture associated with an operation of releasing the shutter of the second camera 62. Upon determining that there is the gesture associated with the operation of releasing the shutter of the second camera 62 (step S8/YES), the control unit 150 causes the image of the third object 330 associated with the gesture to be displayed in the display region VR (step S2). Upon determining that there is no gesture associated with the operation (step S8/NO), the control unit 150 terminates this flow of processing.

When no gesture is detected in step S6 (step S6/NO), the control unit 150 determines whether the elapsed time after the range image 311 was displayed in the display region VR exceeds a first set time (step S9). When the elapsed time does not exceed the first set time (step S9/NO), the control unit 150 returns to step S6 to detect the gesture in the captured image data (step S6). When the elapsed time has exceeded the first set time (step S9/YES), the control unit 150 displays an operation guide in the display region VR (step S10).

Figure 10:
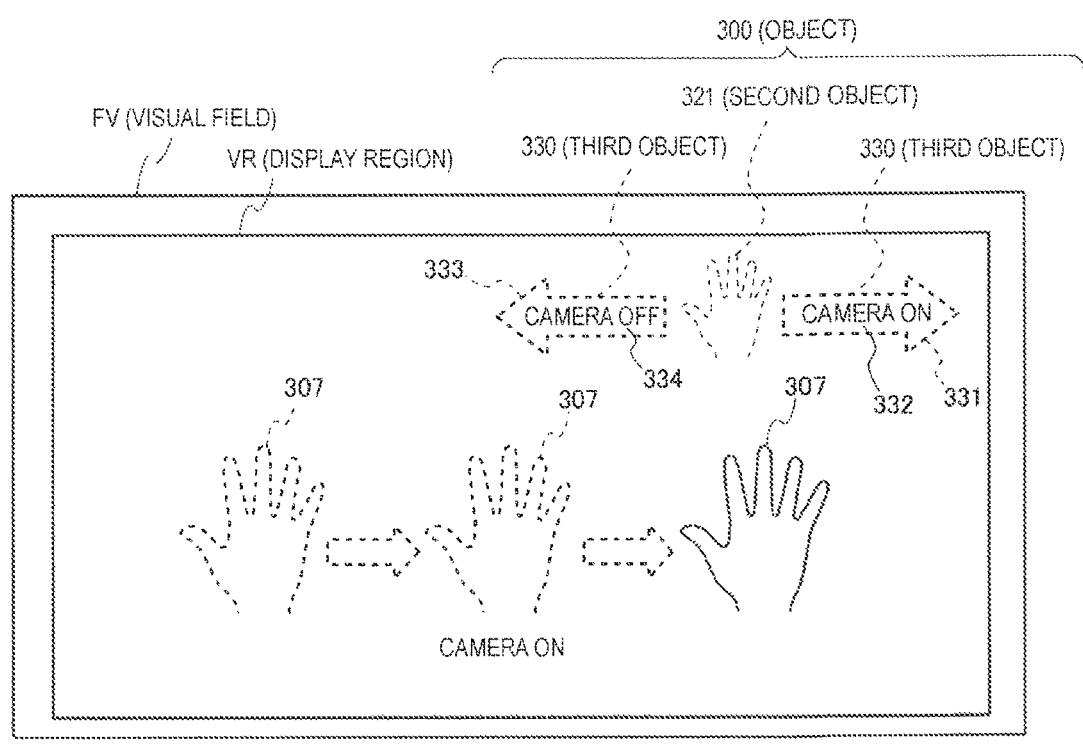
FIG. 10 is a diagram illustrating a display state of the display region.

FIG. 10 is a diagram illustrating the operation guide displayed in the display region VR.

The operation guide is an image for guiding the user to perform a gesture, and is an image representing movement of the gesture to be detected by the control unit 150. An image, a figure, a sign, a mark, or an icon indicative of a hand of the user may be displayed as the indication body in the display region VR in addition to the operation guide. Then, a display position of the image, the displayed figure, sign, mark, or icon may be changed once in every predetermined period of time to indicate the movement corresponding to the gesture. FIG. 10 illustrates an operation guide corresponding to the gesture for turning ON the second camera 62. This operation guide involves displaying an icon 307, indicating a user's hand in the display region VR, and moving the display position of the displayed icon 307 displayed from left to right as viewed from the user once in every predetermined period of time. The operation guide may be a movie captured in advance.

After displaying the operation guide in the display region VR, the control unit 150 performs the gesture detection based on the captured image data obtained by the first camera 61 (step S11). When the gesture is not detected (steer S11/NO), the control unit 150 determines whether a second set time has elapsed after the operation guide was displayed in the display region VR (step S12). When the second set time has not elapsed yet (step S12/NO), the control unit 150 returns to the determination in step S11 and continues the gesture detection (step S9). When the second set time has elapsed (step S12/YES), the control unit 150 stops displaying the operation guide (step S13). Then, the control unit 150 returns to step S9 to determine whether the first set time has elapsed after the displaying of the operation guide was terminated. (step S9). When the first set time has elapsed (step S9/YES), the control unit 150 displays the operation guide again (step S10). When the first set time has not elapsed yet (step S9/NO), the control unit 150 returns to step S6 and performs the gesture detection from the captured image data.

Figure 11:
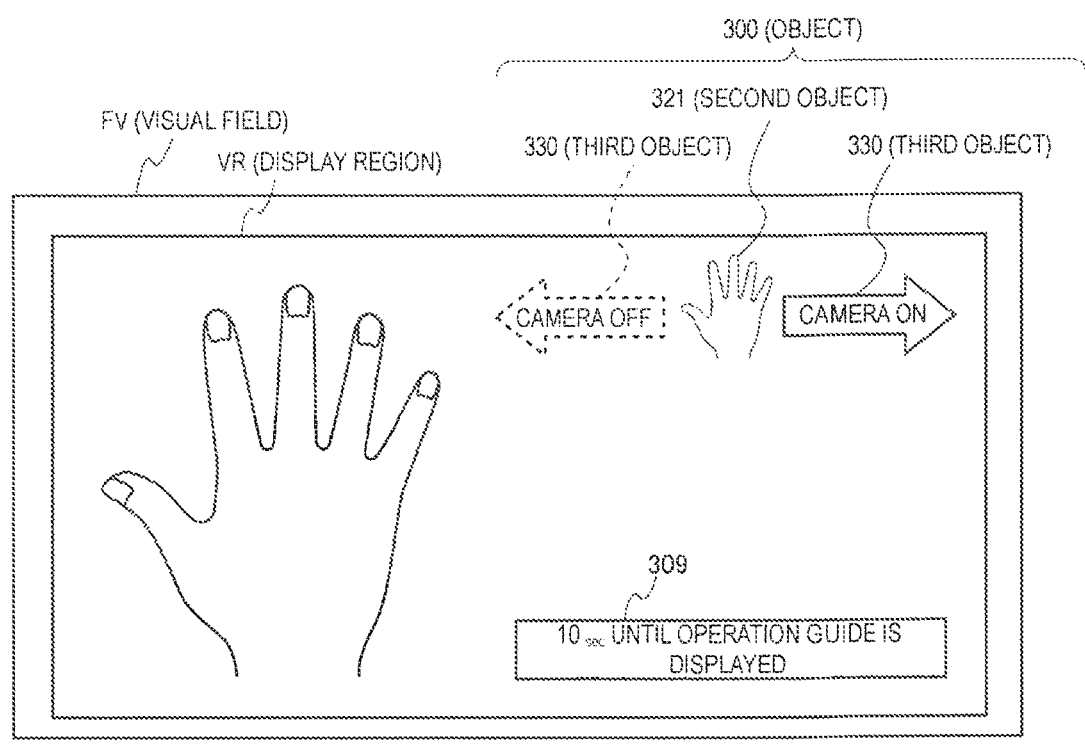
FIG. 11 is a diagram illustrating another display state of the display region.

FIG. 11 is a diagram illustrating another display example of the display region VR.

In the example described above with reference to the flowchart, the operation guide is displayed when the first set time elapses after the range image 311 was displayed in the display region VR. As alternative processing, an indication 309 indicating a remaining time (hereinafter, referred to as remaining time indication) until the operation guide is displayed may be displayed. With the remaining time indication 309 displayed, the user can select whether to display the operation guide.

As described above, the HMD 100 according to the first exemplary embodiment includes the image display unit 20, the first camera 61, and the image capturing control unit 153 operating as the detecting unit, and the detecting unit 154, the display control unit 155, and the processing control unit 156 operating as the control unit.

The image display unit 20 displays an image to be overlapped with an outside scene or displays the image at a periphery of the outside scene. The first camera 61 and the image capturing control unit 153 detect the indication body. The detecting unit 154 receives an operation based on at least one of the movement, the shape, and the position of the detected indication body. The display control unit 155 determines whether an input operation by the indication body can be performed, and displays a determination result.

This configuration enables the user to recognize the state of the HMD 100 to improve usability regarding the operation using the indication body.

The display control unit 155 causes the image display unit 20 to display an image, a figure, a text, or an icon indicating that an operation can be received, at a position set in a display region of the image display unit 20.

This configuration enables the user to instinctively recognize that the HMD 100 is ready to receive the operation.

The display control unit 155 is configured to control a control target in response to the operation, and changes the image, the figure, the text, or the icon indicating that the operation can be received based on the state of the control target controlled based on the operation.

Thus, this configuration enables the user to instinctively recognize the state of the control target.

The first camera 61 captures an image within a range including the outside scene that is visible together with an image displayed by the image display unit 20. The display control unit 155 causes the image display unit 20 to display an indication indicating that an operation can be received, when the indication body has been detected within the range in the captured image data obtained by the first camera 61.

Thus, the user can move the position of the indication body into the range where an outside scene is visible, to make the HMD 100 ready to receive an operation. When the indication body has been detected within the range, the indication indicating that the operation can be received is displayed so that the state of the HMD 100 can be recognized.

The image display unit 20 includes the see-through type display region VR that allows transmission of the external light so that the outside scene is visible. The first camera 61 detects the indication body within the range where an outside scene is visible through the image display unit 20. Thus, the user can move the position of the indication body into the range where an outside scene is visible, to make the HMD 100 ready to receive the operation.

The display control unit 155 may achieve a different display mode of the indication indicating that an operation can be received for each of the following cases: a case where the indication body is detected in the captured image data obtained by first camera 61 and the operation can be received, and a case where the indication body is not detected in the captured image data obtained by the first camera 61 and an operation cannot be received.

Thus, the user can be notified of whether the HMD 100 has detected the indication body.

The display control unit 155 detects a gesture as an input operation based on at least one of the movement, shape, and position of the indication body detected in the captured image data obtained by the first camera 61. The display control unit 155 changes the display mode of any of the image, the figure, the text, or the icon associated with the detected input operation. Thus, the HMD 100 can be operated by the gesture using the indication body. Since the display mode of any of the image, the figure, the text, and the icon associated with the gesture detected by the HMD 100 changes, the user can be notified of the detected gesture.

When the detecting unit 154 detects an indication body, the display control unit 155 displays the range image 311 to be overlapped with the indication body.

Thus, the range image 311 can be displayed to overlap with the indication body. Thus, the object recognized as the indication body by the HMD 100 can be notified.

The display control unit 155 displays the operation guide, for guiding the operation by the indication body in the display region VR, if the detecting unit is not ready to receive the operation even after the first set time elapses from the time when the image, the figure, the text, or the icon is displayed in the display region VR.

Thus, the operation guide can be displayed to guide the operation by the indication body to the user.

The display control unit 155 displays, in the display region VR, a remaining time until the operation guide is displayed in the display region.

Thus, the user who is not familiar with the operation can be notified of a time when the operation guide is displayed.

The display control unit 155 erases the operation guide displayed, when the predetermined second set time elapses after the operation guide is displayed in the display region VR or when the detecting unit 154 detects the operation based on the movement of the indication body.

Thus, the operation guide displayed that is determined to be no longer required to be displayed can be erased so that the visibility of the display region VR can be improved.

The processing control unit 156 controls the device as the control target according to the operation received by the detecting unit 154 or executes the application program as the control target to execute a function of the application program associated with the operation received by the detecting unit 154.

Thus, the device can be controlled by operating of the indication body, and the application program as the control target can be caused to select a function and execute the function.

Second Exemplary Embodiment

A second exemplary embodiment of the invention is described with reference to the accompanying drawings.

When the detecting unit 154 detects an image of an indication body in the captured image data obtained by the first camera 61, the display control unit 155 causes the object 300 to be displayed in the display region VR. In the second exemplary embodiment, the range image 311 serving as the first object 310 is displayed as the object 300.

Upon detecting an indication body in the captured image data, the detecting unit 154 outputs coordinate data indicating a range on the captured image data including the captured image of the indication body, to the display control unit 155. The display control unit 155 performs calculation based on the coordinate data input from the detecting unit 154 to obtain coordinate data of the display region VR surrounding the indication body. The display control unit 155 causes the range image 311 to be displayed in the display region VR corresponding to the obtained coordinate data.

Calibration data is included in the setting data 162 stored by the storage unit 160. The calibration data is data associating the captured image data obtained by the first camera 61 with the display region VR of the image display unit 20. More specifically, the calibration data is for converting coordinates on the captured image data into coordinates on the display region VR. For example, when an image of a real object such as a marker is captured by the first camera 61 and the image is displayed by the image display unit 20 on a position overlapping with the real object whose image has been captured, calibration data 145 for converting coordinates on the captured image data into coordinates on the display region VR is required. Thus, the HMD 100 executes calibration in advance to generate the calibration data for converting coordinates on the captured image data into coordinates on the display region VR.

When the detecting unit 154 detects an image of an indication body in the captured image data obtained by the first camera 61, the display control unit 155 may display the icon 321 serving as the second object 320 and the arrow images 331 and 333 as well as the texts 332 and 334 serving as the third object 330 together with the first object 310. The second object 320 and the third object 330 may be displayed at timing when the application program for executing processing of turning ON or OFF the second camera 62 starts. The second object 320 and third object 330 may be displayed at timing when the detecting unit 154 determines that an operation can be received.

Next, when the detecting unit 154 has detected an indication body, the display control unit 155 determines whether the detecting unit 154 is ready to receive an operation by gesture, and displays a determination result in the display region VR. For example, when the HMD 100 is in a busy state as large load processing such as image processing is executed, the display control unit 155 determines that the detecting unit 154 cannot receive the operation by the gesture.

Upon determining that the HMD 100 is not in the busy state, and the detecting unit 154 is ready to receive the operation by the gesture, the display control unit 155 displays an indication indicating that the operation can be received, in the display region VR. Upon determining that the HMD 100 is in the busy state, and the detecting unit 154 is not ready to receive the operation by the gesture, the display control unit 155 displays an indication indicating that the operation cannot be received, in the display region VR. For example, an image, a figure, or an icon is used as these indications. Furthermore, a text or a sign indicating that an operation can or cannot be received may be displayed.

In the second exemplary embodiment, the display control unit 155 changes the display mode of at least one of the range image 311 and the icon 321 to indicate a state where the detecting unit 154 is ready to receive an operation and a state where the detecting unit 154 is not ready to receive an operation.

For example, the display control unit 155 displays the range image 311 and the icon 321 with a solid line if the detecting unit 154 is ready to receive an operation, and displays the range image 311 and the icon 321 with a broken line if the detecting unit 154 is not ready to receive an operation.

The display control unit 155 makes the range image 311 and the icon 321 blink if the detecting unit 154 is not ready to receive an operation, and lights up the range image 311 and the con 321 if the detecting unit 154 is ready to receive an operation.

The display control unit 155 may achieve different colors of the range image 311 and the icon 321 for each of the following cases: a case where the detecting unit 154 is ready to receive an operation and a case where the detecting unit 154 is not ready to receive an operation.

The display control unit 155 may display the range image 311 and the icon 321 if the detecting unit 154 is configured to receive an operation, and may erase the range image 311 and the icon 321 if the detecting unit 154 is not configured to receive an operation. In this case, the display control unit 155 may change the transmittance to display and erase the range image 311 and the icon 321. Specifically, the display control unit 155 sets the transmittances of the range image 311 and the icon 321 to be low, to display the range image 311 and the icon 321 in the display region VR. The display control unit 155 sets the transmittances of the range image 311 and the icon 321 to be high, to erase the range image 311 and the icon 321 in the display region VR. The range image 311 and the icon 321 with the transmittances set to be a low value are displayed to be more noticeable in contrast to the outside scene visible through the image display unit 20. The range image 311 and the icon 321 with the transmittance set to be a high value are displayed to be more noticeable in contrast to the outside scene visible through the image display unit 20.

The first object 310 and the second object 320 may be displayed in the display region VR at different timings. For example, the detecting unit 154 that has detected a hand region of the user in the captured image data, causes the range image 311 serving as the first object 310 to be displayed. The second object 320 may be caused to be displayed when the hand region is detected in the captured image data and the HMD 100 is ready to receive an operation. The third object 330 may be displayed together with the second object 3320.

The display control unit 155 changes the display mode of the third object 330 corresponding to an operation state of the device as the control target or application program. The third object 330 is an image, a figure, or an icon indicating a movement of an indication body detected by the detecting unit 154. More specifically, the third object 330 is an image, a figure, or an icon indicating a gesture registered in the pattern recognition dictionary 164.

For example, when the control target is the second camera 62 and the operation state of the second camera 62 is OFF, the display control unit 155 causes the third object 330 indicating a gesture associated with an operation of turning ON the second camera 62 to blink or to be turned on. The display control unit 155 may set the transmittance of the third object 330 indicating the gesture associated with the operation of turning ON the second camera 62 to be lower than the transmittance of the third object 330 indicating a gesture associated with an operation of turning OFF the second camera 62. Thus, the third object 330 associated with the operation of turning ON the second camera 62 may be displayed to be more noticeable than the third object 330 associated with the operation of turning OFF the second camera 62.

When the control target is an application program for playing a movie and the movie is being played, display control unit 155 displays the third object 330 corresponding to the gesture associated with an operation to stop the movie being played, fast forward the movie, or rewind the movie. When a movie is not being played while the application program for playing the movie has started, the display control unit 155 displays the third object 330 corresponding to the gesture associated with the operation for playing the movie.

Figure 12:
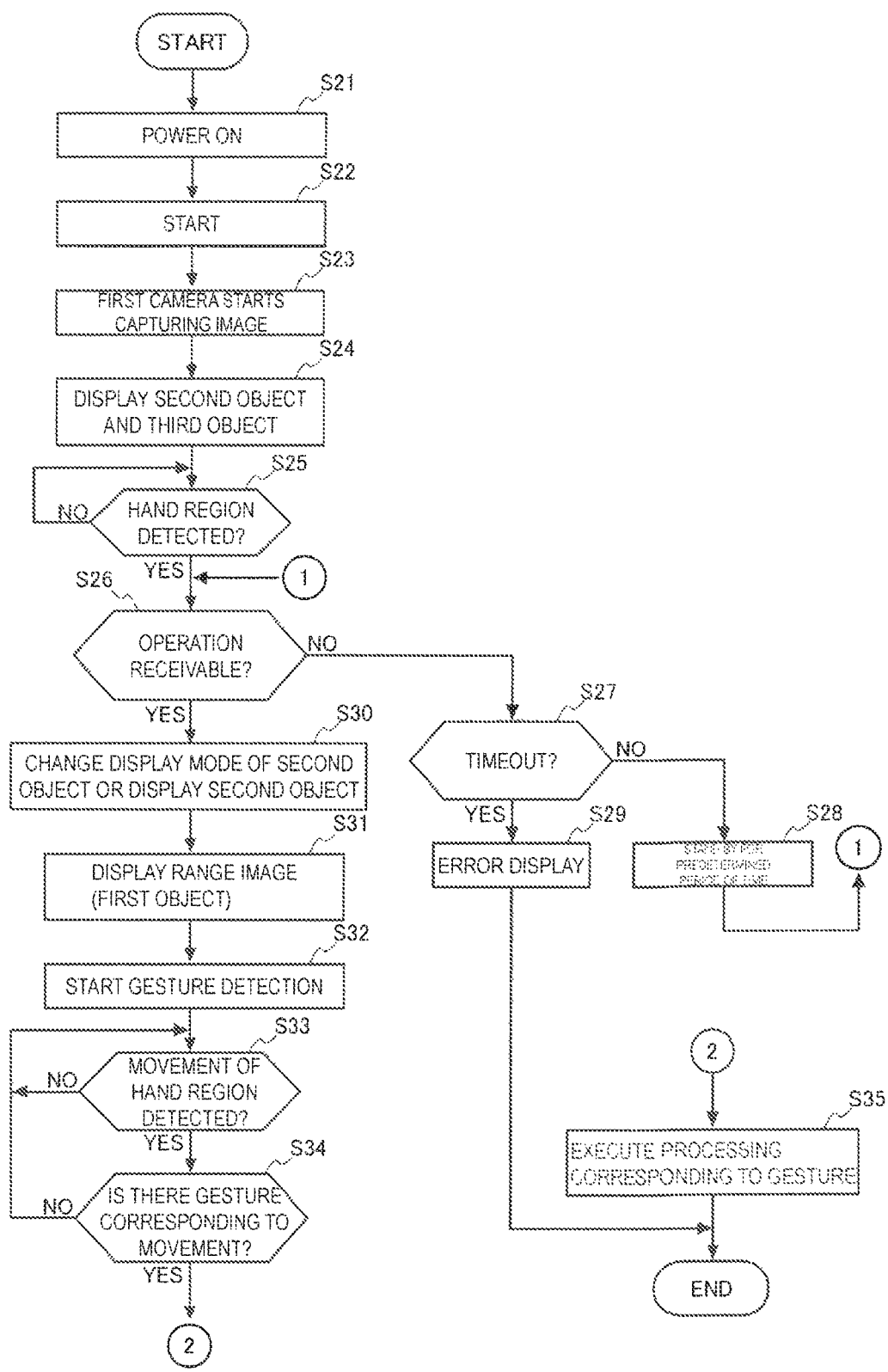
FIG. 12 is a flowchart illustrating another processing executed by the control unit.

FIG. 12 is a flowchart illustrating another processing executed by the control unit 150.

When the power switch 18 is turned ON (step S21), the control program 161 stored in the nonvolatile storage unit 123 is loaded onto a memory 121. Then, the control unit 150 starts (step S22) to start executing the loaded control program 161. The control unit 150 causes the first camera 61 to start capturing an image (step S23).

Upon causing the first camera 61 to start capturing an image, the control unit 150 causes the second object 320 and the third object 330 to be displayed in the display region VR (step S24). The second object 320 has the transmittance set to be high, and thus is displayed to be less noticeable in contrast to the outside scene in the display region VR. Upon detecting a hand region of the user in the captured image data obtained by the first camera 61, the control unit 150 changes the transmittance of the second object 320 to be low. As a result, the second object 320 is displayed to be more noticeable in contrast to the outside scene visible through the image display unit 20, and thus the second object 320 is visible to the user.

In the display region VR, the arrow images 331 and 333, respectively having the text 332 "CAMERA ON" and the text 334 "CAMERA OFF" displayed therein, are displayed as the third object 330 as illustrated in FIG. 9.

Before the hand region is detected, the second camera 62 is OFF. Thus, the arrow image 331 having the text 332 "CAMERA ON" displayed is displayed with a low transmittance, and the arrow image 333 having the text 334 "CAMERA OFF" displayed is displayed with a high transmittance.

As a result, the arrow image 331 having the text 332 "CAMERA ON" displayed is displayed to be more noticeable in contrast to the outside scene visible through the image display unit 20. The arrow image 333 having the text 334 "CAMERA OFF" displayed is displayed to be less noticeable in contrast to the outside scene visible through the image display unit 20. Thus, the display region VR is recognized by the user as an image in which only the arrow image 331 having the text 332 "CAMERA ON" displayed is displayed and the arrow image 333 having the text 334 "CAMERA OFF" displayed is not displayed.

Next, the control unit 150 acquires the captured image data obtained by the first camera 61, and performs the hand region detection with respect to the acquired captured image data (step S25). When the hand region is not detected in the captured image data (step S25/NO), the control unit 150 acquires the next captured image data, and performs the hand region detection to the acquired captured image data.

When the hand region is detected in the captured image data (step S25/YES), the control unit 150 determines whether the control unit 150 is ready to receive an operation (step S26). For example, the control unit 150, which is executing other processing and thus is not ready to newly receive a command, is determined to be not ready to receive an operation (step S26/NO). In this case, the control unit 150 determines whether a timeout time has elapsed since the hand region detection was started in step S25 (step S27).

When the timeout time has not elapsed yet (step S27/NO), the control unit 150 waits for a predetermined period of time (step S28). Then, when the predetermined period of time elapses, the control unit 150 again determines whether the control unit 150 is ready to receive an operation (step S26). When the predetermined timeout time has elapsed (step S26/YES), the control unit 150 causes the image display unit 20 to display an error indication (step S29).

When the control unit 150 is ready to receive an operation (step S26/YES), the control unit 150 changes the display mode of the second object 320 or causes the second object 320 to be displayed in the display region (step S30). Specifically, the control unit 150 changes the value of the transmittance of the second object 320 to be low to increase the visibility of the second object 320. As a result, the second object 320 is displayed to be more noticeable in contrast to the outside scene visible through the image display unit 20. When the second object 320 has not been displayed in step S24, the control unit 150 displays the second object 320 in step S30.

The control unit 150 displays the range image 311 in the display region VR corresponding to an area of the captured image data in which the hand region has been detected (step S31). For example, the control unit 150 displays the range image 311 surrounding the periphery of the detected hand region, in the display region VR.

Next, the control unit 150 starts gesture detection (step S32). Upon displaying the range image 311 in the display region VR, the control unit 150 detects a hand region in each of the pieces of captured image data successively obtained by the first camera 61 to detect a gesture input by the user. An image of the third object 330 displayed in the display region VR is the gesture as the detection target. Specifically, when the second camera 62 is. OFF, a gesture of moving a hand from left to right as viewed from the user is the detection target. The gesture of moving the hand from right to left as viewed from the user is the gesture as the detection target, when the second camera 62 is ON.

The control unit 150 detects the hand region in each of the pieces of captured image data successively obtained by the first camera 61 to detect the movement of the hand region (step S33). When the position of the detected hand region is the same in each of the pieces of captured image data, the control unit 150 determines that the hand region is not moving (step S33/NO) and continues to detect the movement of the hand region.

When the position of the detected hand region changes and thus the hand region is moving (step S33/YES), the control unit 150 determines whether the gesture corresponding to the movement of the hand region detected is registered in the pattern recognition dictionary 164 (step S34).

When the gesture corresponding to the movement of the hand region detected is not registered in the pattern recognition dictionary 164 (step S34/NO), the control unit 150 returns to step S33 to perform the hand region movement detection again. When the gesture corresponding to the movement of the hand region detected is registered in the pattern recognition dictionary 164 (step S34/YES), the control unit 150 executes processing associated with the registered gesture (step S35).

As described above, the HMD 100 according to the second exemplary embodiment includes the image display unit 20, the first camera 61, the detecting unit 154, and the display control unit 155.

The image display unit 20 is mounted on the head of the user and includes the display region VR in which an image is displayed while the outside scene is visible.

The detecting unit 154 detects a movement of an indication body based on captured image data obtained by the first camera 61, and receives an operation based on the detected movement of the indication body.

The display control unit 155 determines whether the detection unit 154 is ready to detect the operation based on the detected movement of the indication body, and displays a determination result in the display region VR.

With this configuration, the determination result of whether the detecting unit 154 is ready to detect the operation based on the movement of the indication body is displayed in the display region VR. Thus, a user interface with high usability enabling the state of the HMD 100 to be recognized can be provided to the operation using the indication body.

The display control unit 155 displays, in the display region VR, a figure, a text, or an icon indicating that the detecting unit 154 is ready to detect the operation, or a range image 311 indicating a range of the indication body detected by the detecting unit 154 as the determination result.

With this configuration, the figure, the text, the icon, or the range image is displayed as the determination result, and thus a notification indicating whether the detecting unit 154 is ready to detect an operation can be issued to the outside.

The display control unit 155 displays the range image 311 in the display region VR when the detecting unit 154 has detected the indication body, and changes the display mode of the figure, the text, or the icon displayed in the display region VR depending on whether the detecting unit 154 is ready to detect the operation. The figure, the text, or the icon includes the icon 321 serving as the second object 320 as well as the arrow images 331 and 332 and the texts 332 and 334 serving as the third object 330.

With this configuration, a notification indicating that the detecting unit 154 has detected the indication body can be issued to the outside, and a notification indicating that the detecting unit 154 is or is not ready to detect an operation can be issued to the outside.

The display control unit 155 displays, as the figure or the icon, a figure or an icon indicating the movement of the indication body to be detected by the detecting unit 154 when the detecting unit 154 is ready to detect the operation.

With this configuration, the figure or the icon indicating the movement of the indication body to be detected by the detecting unit 154 is displayed, and thus the user can recognize the operation using the indication body.

The HMD 100 also includes the processing control unit 156 configured to control a control target in response to the operation received by the detecting unit 154. The display control unit 155 changes the figure or the icon indicating a predetermined movement of the indication body to be detected by the detecting unit 154, according to an operation state of the control target.

With this configuration, the user can be caused to move the indication body corresponding to the operation state of the control target, and the control target can be operated based on the movement of the indication body. Thus, usability of the operation using the indication body can be improved.

The detecting unit 154 determines whether the detected movement of the indication body corresponds to the predetermined movement of the indication body. The processing control unit 156 may cause, when the detecting unit has detected a movement of the indication body corresponding to the predetermined movement of the indication body, the control target to execute processing associated with the movement of the indication body detected by the detecting unit 154.

With this configuration, the predetermined movement of the indication body is performed to cause the control target to execute the processing associated with this movement of indication body.

The embodiments described above are embodiments appropriate for the technique of the invention. However, these embodiments should not be construed in a limiting sense, and can be modified in various ways without departing from the spirit of the invention.

While the movement, the shape, and the position of the indication body are detected based on the capture image data of the first camera 61 in the exemplary embodiments described above, the movement, the shape, and the position of the indication body may be detected with sensors such as infrared sensors, electromagnetic sensors, optical sensors, and ultrasonic sensors.

The display control unit 155 may change the display mode of the second object 320 among a case where the hand region is detected and the control unit 150 is ready to receive an operation, a case where the hand region is not detected, and a case where the hand region is detected, but the control unit 150 is not ready to receive an operation.

For example, the display control unit 155 sets the transmittance of the second object 320 to be the lowest when the hand region is detected and the control unit 150 is ready to receive an operation. The display control unit 155 sets the transmittance of the second object 320 to be the highest when the hand region is not detected. The display control unit 155 sets the transmittance of the second object 320 to be between the transmittances set for the case where the control unit 150 is not ready to receive an operation and the case where the hand region is not detected.

The HMD 100 may include an interface (not illustrated) that couples various types of external devices serving as a content source. For example, this interface may be an interface that supports wired connection such as a USB interface, a micro USB interface, and a memory card interface, or may include a wireless communication interface. The external devices in this context are image supply devices configured to supply images to the HMD 100, and personal computers (PCs), mobile phone terminals, mobile game consoles, and the like can be used as the external devices. In this case, the HMD 100 can output images and sound based on the content data 163 input from these external devices.

In the embodiment described above, the configuration where the control device 10 and the image display unit 20 are in wired connection is described as an example. However, the invention is not limited to this configuration, and a configuration where the control device 10 is in wireless connection with the image display unit 20 may be employed. This configuration may employ a communication system described as an example of the communication system supported by the communication unit 17, or may employ any other communication system.

The image display unit 20 may have a part of the functions of the control device 10, and the control device 10 may be implemented by a plurality of devices. Specifically, the control device 10 is not limited to a configuration with the box-shaped casing 10A. For example, a wearable device that can be attached to the body or clothing of the user may be used instead of the control device 10. For example, the device wearable by the user may be a watch-type device, a ring-type device, a laser pointer, a mouse, an air mouse, a game controller, a pen-type device, or the like.

In the embodiments described above, the configuration where the image display unit 20 and the control device 10 are separately provided and are connected to each other via the connection cable 40 is described as an example. However, the invention is not limited to this configuration, and a configuration may be employed where the control device 10 and the image display unit 20 are integrated to be mounted on the head of the user.

The control device 10 may be a laptop computer, a tablet computer, or a desktop computer. Furthermore, the control device 10 may be portable electronic equipment including a game console, a mobile phone, a smartphone, and a portable media player, or may be other dedicated devices.

For example, an image display unit with a configuration different from that of the image display unit 20, such as an image display unit that is worn like a hat, may be employed, as long as the display unit that displays an image for the left eye LE of the user and the display unit that displays an image for the right eye RE are provided. A head-up display may be used instead of the image display unit 20 to be installed in a vehicle such as an automobile or an aircraft. For example, the head-up display is installed in a vehicle with an operation surface, serving as the operation surface of the trackpad 14, provided on a steering wheel of the vehicle or the like.

Furthermore, the invention may be applied to a head mounted display device incorporated in a body protector such as a helmet. In such a case, a position facing the body of the user may be referred to as a positioning portion and a portion positioned with respect to the portion may be referred to as a wearing portion.

In the example described above, the optical system that guides the image light to the eyes of the user has the configuration where virtual images are partially formed on the right light-guiding plate 26 and the left light-guiding plate 28 by the half mirrors 261 and 281. However, the invention is not limited to this configuration, and a configuration where the image is formed on a display region having an area entirely or mostly covering the right light-guiding plate 26 and the left light-guiding plate 28 may be employed.

With this configuration, the processing of changing the display position of an image may include processing of downscaling the image.

The optical element of the invention is not limited to the right light-guiding plate 26 and the left light-guiding plate 28 including the half mirrors 261 and 281, and may be any optical part enabling the image light to be incident on the user's eyes. Specifically, a diffraction grating, a prism, or a holography display unit may be used.

At least a part of the functional blocks illustrated in FIG. 4, FIG. 5, and the like may be implemented with hardware or may be implemented with cooperation between hardware and software, and thus is not limited to the illustrated configuration where independent hardware resources are arranged. A program executed by the control unit 150 may be stored in the nonvolatile storage unit 123 or in the storage devices (not illustrated) in the control device 10. A configuration where a program stored in an external device is acquired through the communication unit 117 and the external connector 184 to be executed may be employed. The operation unit 110, in the configuration formed in the control device 10, may be formed as a user interface (UI).

The flowcharts illustrated in FIG. 7 and FIG. 12 are divided into processing units based on main processing contents, so that the processing executed by the control unit 150 of the HMD 100 can be easily understood. Thus, the invention is not limited to how the processing is divided into process units or the names of the process units. The processing executed by the control unit 150 may be divided more in detail so that more process units are provided, or may be divided so that a single process unit include more processes. The processing order in the flowcharts described above is not limited to the illustrated examples.

When implemented by a computer, the method of controlling a head mounted display device according to the invention can be configured in the form of a program executed by the computer, a recording medium configured to record a program in a computer-readable manner, or a transmission medium configured to transmit a program. A magnetic or optical recording medium or a semiconductor memory device can be used for the recording medium. Specific example of the recording medium include a flexible disk, a hard disk drive (HDD), compact disk read only memory (CD-ROM), a digital versatile disk. (DVD), a Blu-ray (trade name) disc, a magneto-optical disc, a flash memory, a card-type recording medium, and other portable recording media, or fixed recording media. The recording medium may be a nonvolatile storage device such as a random access memory (RAM), a read only memory (ROM), and an HDD that are internal storage devices included in an image display device.

The entire disclosure of Japanese Patent Application No. 2018-095200, filed May 17, 2018 and 2017-174938, filed Sep. 12, 2017 are expressly incorporated by reference herein.

What is claimed is:

1. A head mounted display device for use with a head of a user, the head mounted display device comprising:
   a display that is mounted on the head of the user, the display including a display region configured to display an image while an outside scene is visible;
   a camera; and
   a processor and/or circuit configured to execute:
      a first step of determining whether an operation based on a movement of an indication body is detectable by the camera,
      a second step of displaying a determination result indicating whether the operation is detectable by the camera in the display region,
      a third step of detecting the movement of the indication body based on a captured image captured by the camera, and
      a fourth step of receiving the operation based on the detected movement of the indication body.

2. The head mounted display device according to claim 1, wherein
   the processor and/or circuit is configured to display, in the display region, as the determination result: (i) a figure, (ii) a text, (iii) an icon indicating that the processor and/or circuit is ready to detect the operation, or (iv) a range image indicating a range of the indication body detected by the processor and/or circuit.

3. The head mounted display device according to claim 2, wherein the processor and/or circuit is further configured to:
   display the range image in the display region when the indication body is detected, and to
   change a display mode of the figure, the text, or the icon displayed in the display region depending on whether the camera or the processor and/or circuit is ready to detect the operation.

4. The head mounted display device according to claim 2, wherein the processor and/or circuit is configured to display, as the figure or the icon, a figure or an icon indicating the movement of the indication body to be detected, when the processor and/or circuit is ready to detect the operation.

5. The head mounted display device according to claim 4, wherein the processor and/or circuit is further programmed to:
   control a control target in response to the operation received by the detecting unit, and
   change the figure or the icon indicating a predetermined movement of the indication body to be detected, according to an operation state of the control target.

6. The head mounted display device according to claim 5, wherein the processor and/or circuit is further configured to:
   determine whether the detected movement of the indication body corresponds to the predetermined movement of the indication body, and
   cause, when a movement of the indication body is detected as corresponding to the predetermined movement of the indication body, the control target to execute processing associated with the detected movement of the indication body.

7. The head mounted display device according to claim 2, wherein the processor and/or circuit is configured to display the range image to be overlapped with the indication body, when the indication body is detected.

8. The head mounted display device according to claim 2, wherein the processor and/or circuit is configured to display an operation guide for guiding the operation by the indication body in the display region, if the processor and/or circuit is not ready to receive the operation even after a predetermined first set time elapses from the time when the figure, the text, or the icon is displayed in the display region.

9. The head mounted display device according to claim 8, wherein the processor and/or circuit is configured to display, in the display region, a remaining time until the operation guide is displayed in the display region.

10. The head mounted display device according to claim 8, wherein the processor and/or circuit is configured to erase the operation guide being displayed, when a predetermined second set time elapses after the operation guide is displayed in the display region or when the operation is detected based on the movement of the indication body.

11. The head mounted display device according to claim 5, wherein the processor and/or circuit is configured to: (A) control a device as the control target according to the detected operation, or (B) execute an application program as the control target to execute a function of the application program corresponding to the detected operation.

12. A method of controlling a head mounted display device that is mounted on a head of a user, the head mounted display device having a camera and an image display that is configured to display, in a display region, an image while an outside scene is visible, the method comprising:
- a first step of determining whether an operation based on a movement of an indication body is detectable by the camera;
- a second step of displaying a determination result indicating whether the operation is detectable by the camera in the display region;
- a third step of detecting the movement of the indication body based on a captured image captured by the camera; and
- a fourth step of receiving the operation based on the detected movement of the indication body.

\* \* \* \* \*